United States Patent
Beyfuss et al.

(10) Patent No.: US 9,222,518 B2
(45) Date of Patent: Dec. 29, 2015

(54) DEVICE FOR CENTERING A BEARING RING IN A HOLDING ELEMENT

(75) Inventors: Berthold Beyfuss, Wasserlosen-Kaisten (DE); Hans-Juergen Friedrich, Könlgsberg-Römershofen (DE); Alfred Radina, Poppenlauer (DE); Jonas Schierling, Haßfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 205 days.

(21) Appl. No.: 13/988,213

(22) PCT Filed: Nov. 21, 2011

(86) PCT No.: PCT/EP2011/070550
§ 371 (c)(1),
(2), (4) Date: Jul. 25, 2013

(87) PCT Pub. No.: WO2012/069408
PCT Pub. Date: May 31, 2012

(65) Prior Publication Data
US 2014/0064651 A1 Mar. 6, 2014

(30) Foreign Application Priority Data
Nov. 25, 2010 (DE) .................. 10 2010 061 914

(51) Int. Cl.
| | | |
|---|---|---|
| F16C 35/04 | (2006.01) | |
| F16C 35/077 | (2006.01) | |
| F16C 33/58 | (2006.01) | |
| F16B 21/18 | (2006.01) | |

(52) U.S. Cl.
CPC ............ *F16C 35/077* (2013.01); *F16C 33/586* (2013.01); *F16C 35/045* (2013.01); *F16B 21/18* (2013.01)

(58) Field of Classification Search
CPC ....... F16C 33/077; F16C 35/045; F16B 21/18
See application file for complete search history.

(56) References Cited

U.S. PATENT DOCUMENTS

| | | | | |
|---|---|---|---|---|
| 3,481,655 A | * | 12/1969 | Campbell | ..................... 384/536 |
| 6,318,900 B1 | * | 11/2001 | Bere et al. | ..................... 384/535 |
| 7,927,021 B2 | * | 4/2011 | Schumacher et al. | ........ 384/537 |
| 2010/0220949 A1 | * | 9/2010 | Baier et al. | .................... 384/511 |

FOREIGN PATENT DOCUMENTS

| | | |
|---|---|---|
| DE | 1525170 A | 8/1969 |
| DE | 6933767 U | 12/1969 |
| DE | 2247377 A | 6/1973 |
| DE | 3041882 A1 | 6/1982 |
| DE | 209234 A1 | 4/1984 |

(Continued)

*Primary Examiner* — Thomas R. Hannon
(74) *Attorney, Agent, or Firm* — Bryan Peckjian; SKF USA Inc. Patent Dept.

(57) ABSTRACT

A centering assembly (100; 200; 400) serves to center a bearing ring (123; 423) in a circular opening (111) of a holding element (110; 210; 510; 610). The centering assembly (100; 200; 400) includes at least three centering elements (101; 201; 301; 401; 501; 601) that are each elastically deformable in the radial direction of the bearing ring. The centering elements (101; 201; 301; 401; 501; 601) are respectively disposed in recesses (114; 214; 514; 614) defined around a circumferential edge of the circular opening. The centering elements urge the bearing ring to be centered relative to the holding element.

13 Claims, 23 Drawing Sheets

(56) References Cited

FOREIGN PATENT DOCUMENTS

| DE | 4422662 | C2 | 8/2003 |
|---|---|---|---|
| DE | 10355407 | B3 | 5/2005 |
| DE | 102005012323 | B3 | 6/2006 |
| DE | 102007033168 | A1 | 1/2009 |
| FR | 2892478 | A3 | 4/2007 |
| GB | 161911 | A | 4/1921 |

* cited by examiner

DEVICE FOR CENTERING A BEARING RING IN A HOLDING ELEMENT

CROSS-REFERENCE

This application is the U.S. national stage of International Application No. PCT/EP2011/070550 filed on Nov. 21, 2011, which claims priority to German patent application no. 10 2010 061 914.0 filed on Nov. 25, 2010.

TECHNICAL FIELD

The present invention relates to a concept for centering a bearing ring in an opening provided therefor of a holding element, in particular a centering assembly proposed therefor, a bearing ring, and a holding element for the bearing ring.

RELATED ART

When supporting shafts, one end of a shaft is often supported using a so-called locating bearing. The locating bearing rotatably supports the shaft and is supported by a bearing outer part, such as for example a bearing outer ring, in the radial direction on a bearing housing, such as e.g. on a transmission housing. Further, the locating bearing can also be axially fixed with respect to the housing. Holding elements, which are also referred to as retainers, can also be used for this purpose. They serve, in particular, to fix one or more bearings in an installation environment, in which a satisfactory fixing of the bearing would be achievable only with difficulty without the use of the holding elements. This is for example the case with the installation of bearings in a transmission of motor vehicles, in particular when a transmission housing is manufactured from a light metal. In view of temperature changes, vibrations, and continually changing load conditions occurring there, a reliable fixing of the bearing by a simple engagement in a transmission housing is usually not ensured. On the other hand, by using the holding element, which can be screw-connected with the transmission housing, a long-lasting, durable fixing of the bearing in the transmission housing can be realized in a relatively simple way.

Such holding elements are known in various embodiments. The holding element can be formed for example as a plate-shaped, one-piece metal plate part, which has a central opening in the form of a circular or cylindrical receiving opening for receiving the bearing or its bearing outer rings, and threaded bores for attaching the holding element on a housing, which threaded bores are uniformly distributed around a circumference of the holding element. The bearing to be received by the holding element has an outer ring, which has a reduced outer diameter in a portion of its axial extension, so that an outer surface of the outer ring is formed in a stepped manner and effectively has a shoulder. The outer ring is inserted into the central opening of the holding element with the portion having the reduced outer diameter, before it is screw-fastened with, for example, a transmission housing.

SUMMARY

Although a bearing can be reliably fixed to the housing known holding elements, however depending on the installation environment it can prove to be difficult to bring the holding element exactly into a desired installation position relative to a to-be-supported shaft. If the outer surface of the bearing ring abuts on the edge of the receiving opening already prior to an alignment with the shaft, it can be practically impossible to move a bore for the shaft even further radially outward without radially loading the bearing ring too heavily in the circular receiving opening, which is provided for this purpose, of the (flange-type) holding element, due to insufficient radial tolerances between the outer surface of the bearing ring and the inner surface of the receiving opening, and thereby possibly causing cracks in the bearing ring.

Therefore in one aspect of the present teachings, it is possible to reduce large radial contact forces between the respective surfaces, which forces could occur while screw-fastening a holding element together with a bearing ring.

In another aspect of the present teachings, a bearing ring is inserted and held preferably centered in the receiving opening of the holding element. Between the bearing ring outer surface and the inner surface of the receiving opening of the holding element, a substantially uniform clearance around a circumferential direction of the bearing ring outer surface thereby results. Upon attaching the holding element together with the bearing ring onto a bearing housing, this clearance allows a (subsequent) alignment of the bearing ring relative to a position of the to-be-supported shaft, without causing too-large radial forces on the bearing ring and/or on the receiving opening.

For the proposed centering, exemplary embodiments of the present invention provide a centering assembly for centering a bearing ring in a circular or cylindrical central receiving opening provided therefor of a holding element. The centering assembly includes at least three centering elements which are each elastically deformable in the radial direction, which centering elements can be disposed around a circumference of the circular receiving opening in recesses provided therefor in an edge region of the receiving opening, and can radially center the bearing ring upon its insertion into the circular receiving opening.

For an optimal radial centering, the at least three centering elements are preferably disposed uniformly, i.e. offset by the same angle, around the circumference of the circular receiving opening. With three centering elements, an offset angle results for example of approximately 360°/3=120° between two adjacent centering elements.

According to some exemplary embodiments of the present invention, the centering elements that are elastic in the radial direction can be spring steel plates or clips made from spring steel plate, which spring steel plates or clips made from spring steel plate are radially deformable or elastic in the radial direction. According to other exemplary embodiments, the centering elements are formed from a plastic that is elastic in the radial direction.

The at least three centering elements can be formed as individual or separate elements, which accordingly can each be individually inserted into the recess provided therefor in the edge region of the receiving opening. On the other hand, the at least three centering elements can also be disposed on a ring corresponding to the circumference of the circular receiving opening, so that the centering elements can engage in the recess provided therefor in the edge region of the receiving opening when the ring is set onto the receiving opening of the holding element.

In order to captively hold the bearing ring in the (flange-type) holding element in an axial direction of the bearing, each of the centering elements can have a radial projection on a side facing towards the bearing ring, which radial projection is resilient in the radial direction, and which, upon disposing the centering element in the recess provided therefor, can interact with a complementary radially-outwardly-projecting projection of the bearing ring that has been inserted into the opening. Here in the present case, the "interaction" can be understood to mean a latching of a hook-shaped, inwardly-projecting projection of a centering element under the outwardly-projecting projection of the bearing ring, or a friction-fit connection between an end side of a radially-inwardly-projecting projection of the centering element and an end side of the radially-outwardly-projecting projection of the bearing ring.

Exemplary embodiments of the present invention accordingly also comprise a bearing ring, in particular a bearing outer ring, having an outer diameter which is reduced in a portion of its axial extension, in order to insert the bearing ring into a circular receiving opening provided therefor, wherein the bearing ring has an encircling radial projection in an axial end region of the reduced outer diameter, which radial projection can interact with a resilient radial projection of a centering element disposed in an edge region of the receiving opening, in order to hold the bearing ring in the holding element.

Furthermore, a holding element for a bearing is proposed, having a circular receiving opening for the bearing ring of the bearing, wherein in an edge region of the receiving opening around a circumference of the receiving opening, recesses are introduced for at least three centering elements of a centering assembly for centering the bearing ring in the circular receiving opening, the centering elements each being elastically deformable in the radial direction.

In certain exemplary embodiments it is possible to prevent a bearing ring located in the receiving opening from slipping in the radial direction when attaching the holding element to a housing. Thus, when the locating bearing is mounted on a housing, a sufficient clearance remains between the outer surface of the bearing ring and the opposing surface of the receiving opening to compensate for tolerances with respect to a relative position of a to-be-supported shaft by slightly displacing the bearing ring within the receiving opening in the radial direction. Thus, it is possible to prevent large radial contact forces between the outer surface of the bearing ring and the surface of the receiving opening in the radial direction, whereby damaging cracks on bearing rings and/or holding elements can in turn be prevented.

BRIEF DESCRIPTION OF THE DRAWINGS

Exemplary embodiments of the present invention are explained in more detail below with reference to the accompanying figures.

DETAILED DESCRIPTION OF THE INVENTION

Figure 1:
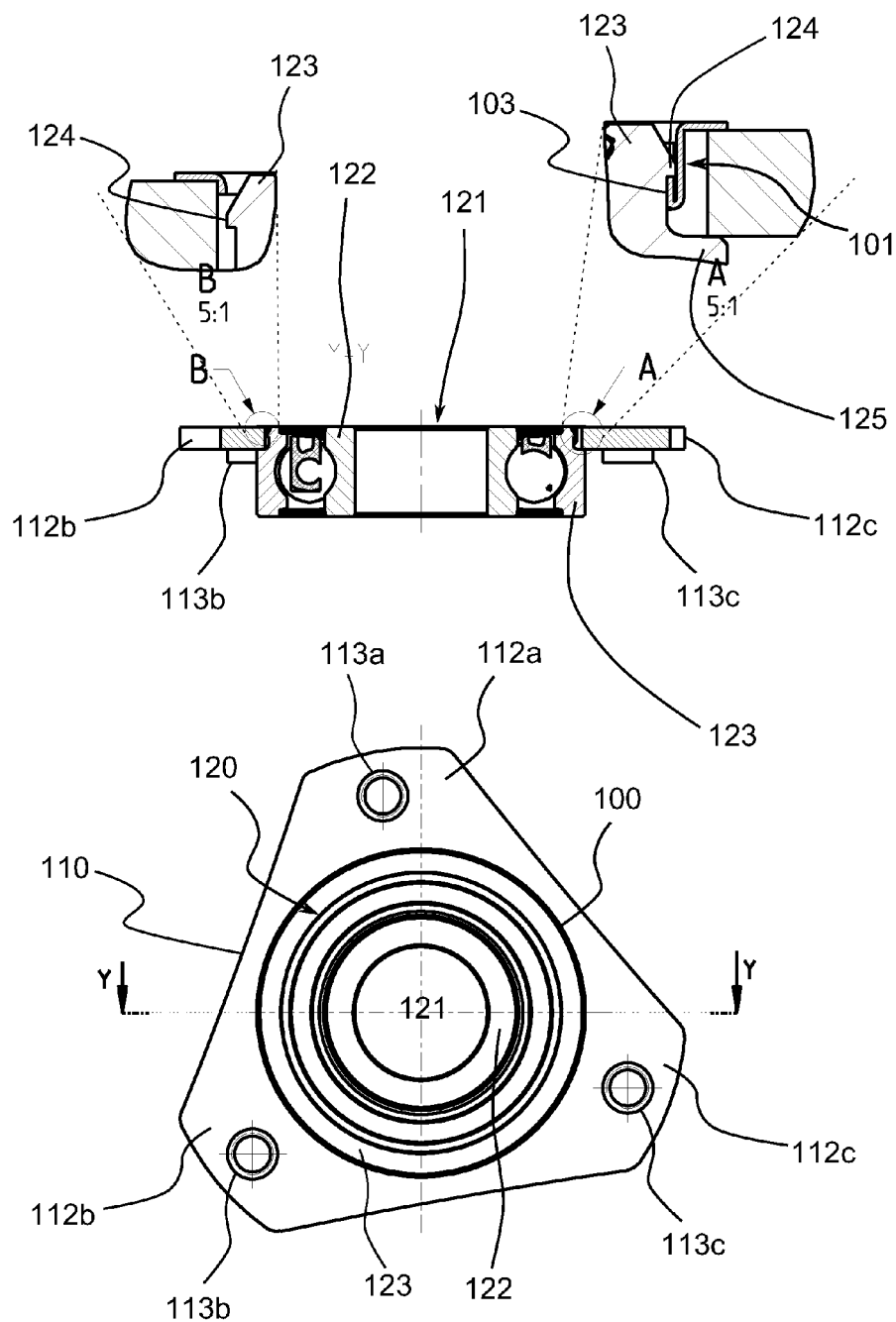
FIG. 1 shows various views of a rolling-element bearing disposed centered in a holding element using a centering assembly, according to a first exemplary embodiment of the present invention.

FIG. 1 shows various views of a first bearing assembly, wherein a bearing 120 according to a first exemplary embodiment of the present invention can be held centered in a holding element 110 using a centering assembly 100. The holding element 110 provided for this purpose is shown in more detail in various views in FIG. 2, whereas the centering assembly 100 is shown more precisely in various views in FIG. 3.

Figure 2:
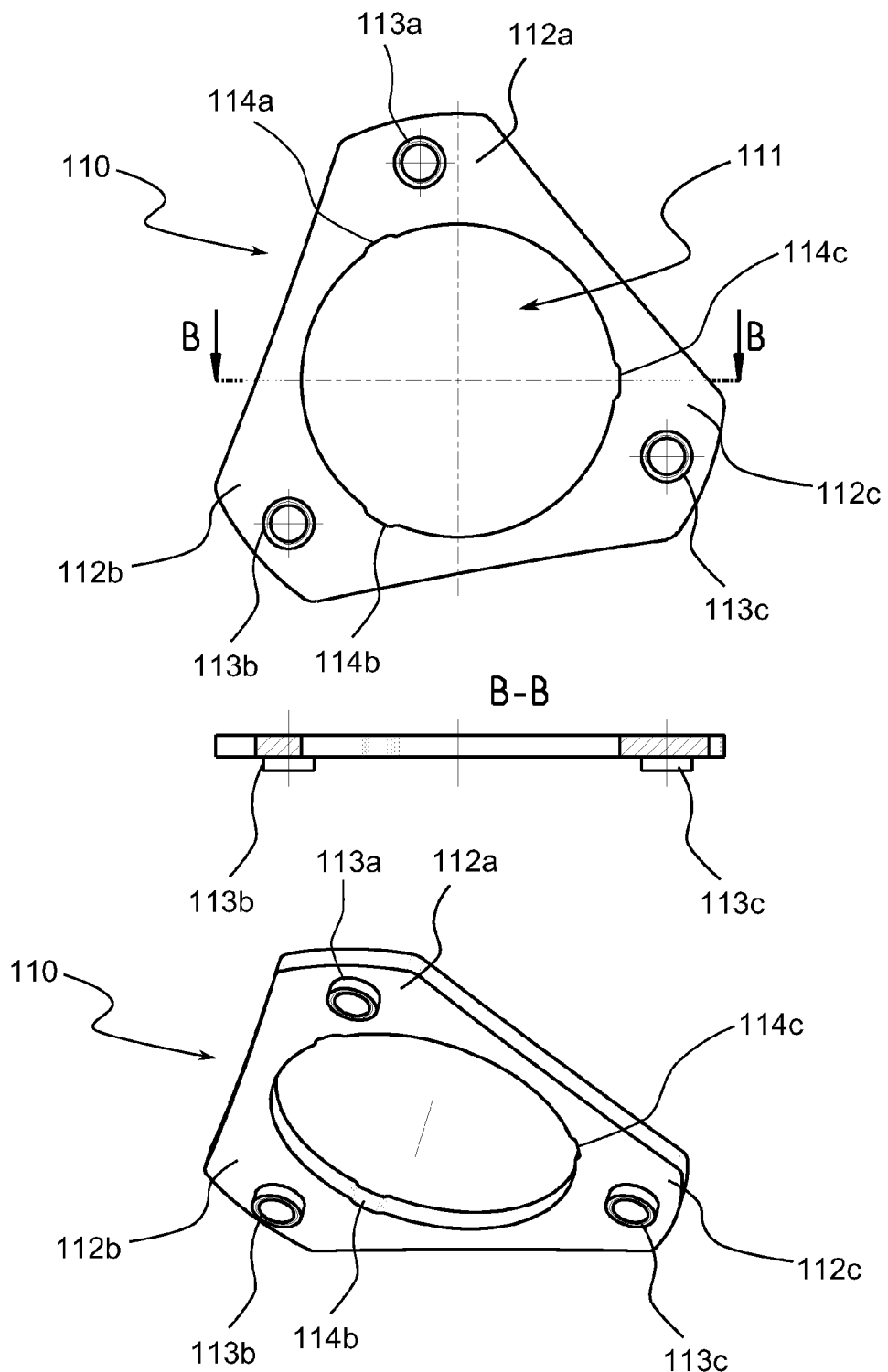
FIG. 2 shows various views of the holding element according to FIG. 1.

The lower part of FIG. 1 shows, in plan view, the bearing assembly including the holding element 110, which holds the bearing 120 in one of the central openings 111 in the shape of a circular receiving opening, which central opening 111 is more recognizable in FIG. 2. For this purpose, distributed (e.g. uniformly) around a circumference of holding element 110, the holding element 110 has fixing sections 112a, 112b, and 112c having respective threaded bores 113a, 113b, and 113c. The fixing sections 112a, 112b, and 112c here each include a form of radially-outwardly-extending flanges, wherein other shapes are also of course conceivable. Using the threaded bores 113a, b, and 113c and corresponding screws, the bearing assembly made from holding element 110, centering assembly 100, and bearing 120 can be attached for example to a bearing housing, so that for example a locating bearing for supporting a (not shown) shaft results. The shaft, which is not shown in the present Figures, can be brought for this purpose through an opening or bore 121 provided therefor of a bearing inner ring 122 of the bearing 120 (see FIG. 1). Thus the holding element effectively represents an attachment flange having bores.

Figure 3:
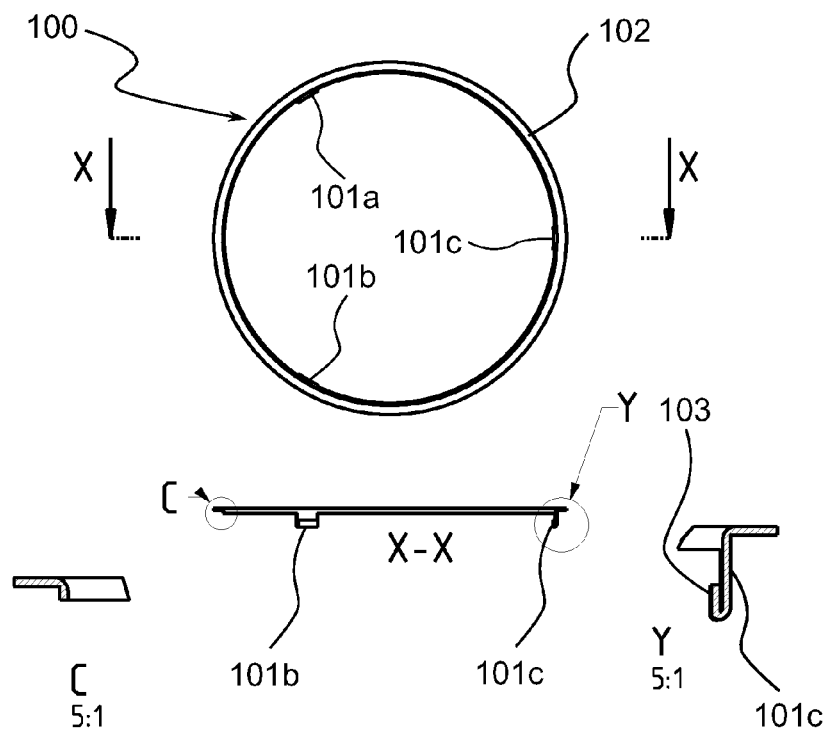
FIG. 3 shows various views of the centering assembly including three centering elements according to FIG. 1 disposed in a ring shape and which are each elastically deformable in the radial direction.
Figure 3:
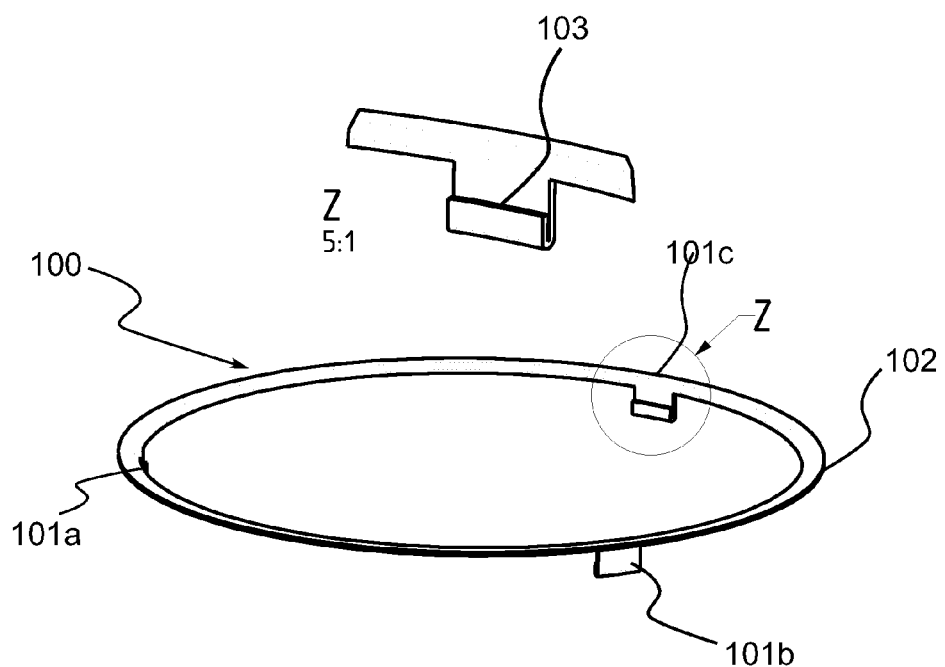

Around the circumference of the circular receiving opening 111, the holding element 110 has, as shown in FIG. 2, recesses 114a, b, c in an edge region of the receiving opening 111 for at least three centering elements 101a, 101b, 101c of the centering assembly 100, each centering element being elastically deformable in the radial direction (see FIG. 3). In order to achieve as optimal as possible a centering effect for the to-be-held bearing 120, the recesses 114a, b, c are preferably uniformly distributed around the circumference of the receiving opening 111. In the present case, "uniformly" means for example that adjacent recesses are each disposed offset by an angle of 360°/N, wherein N is a number of recesses (N≥3). With three recesses 114a, b, c, an offset angle thus results, for example, of 120°.

The shapes of the at least three recesses 114a, b, c are matched to the at least three centering elements 101a, 101b, 101c of the centering assembly 100, as will be discussed in more detail in the further description.

Using the centering assembly 100 for centering the bearing outer ring 123, one of the bearing rings or bearing outer rings 123 of the bearing 120, which is to be held by the holding element 110, is centered in the circular receiving opening 111 provided therefor of the holding element 110. Various views of the centering assembly 100 are shown in FIG. 3 according to a first exemplary embodiment.

According to the exemplary embodiment shown in FIG. 3, the centering assembly 100 includes three centering elements 101a, 101b, and 101c, each of which is elastically deformable in the radial direction, and each of which can be disposed in the recesses 114a, b, and 114c provided therefor in the edge region of the receiving opening 111 around a circumference of the circular receiving opening 111, and each of which can thereby center the bearing outer ring 123 in the circular receiving opening 111 of the holding element 100. On the one hand, the centering can take place after the bearing outer ring 123 has been placed into the circular receiving opening 111, i.e. effectively retroactively. In this case, the centering elements 101a, 101b, 101c of the centering assembly 100 are subsequently pushed between the outer surface of the bearing outer ring and the edge of the receiving opening 111, so that the centering elements 101a, 101b, 101c are accommodated in the recesses 114a, b, c. On the other hand, a placement of the centering assembly 100 or its centering elements 101a, 101b, and 101c in the recesses 114a, b, and 114c is also possible before the bearing outer ring 123 is introduced into the circular receiving opening 111, so that the bearing outer ring 123 is centered simultaneously with its insertion in the circular receiving opening 111.

Figure 4:
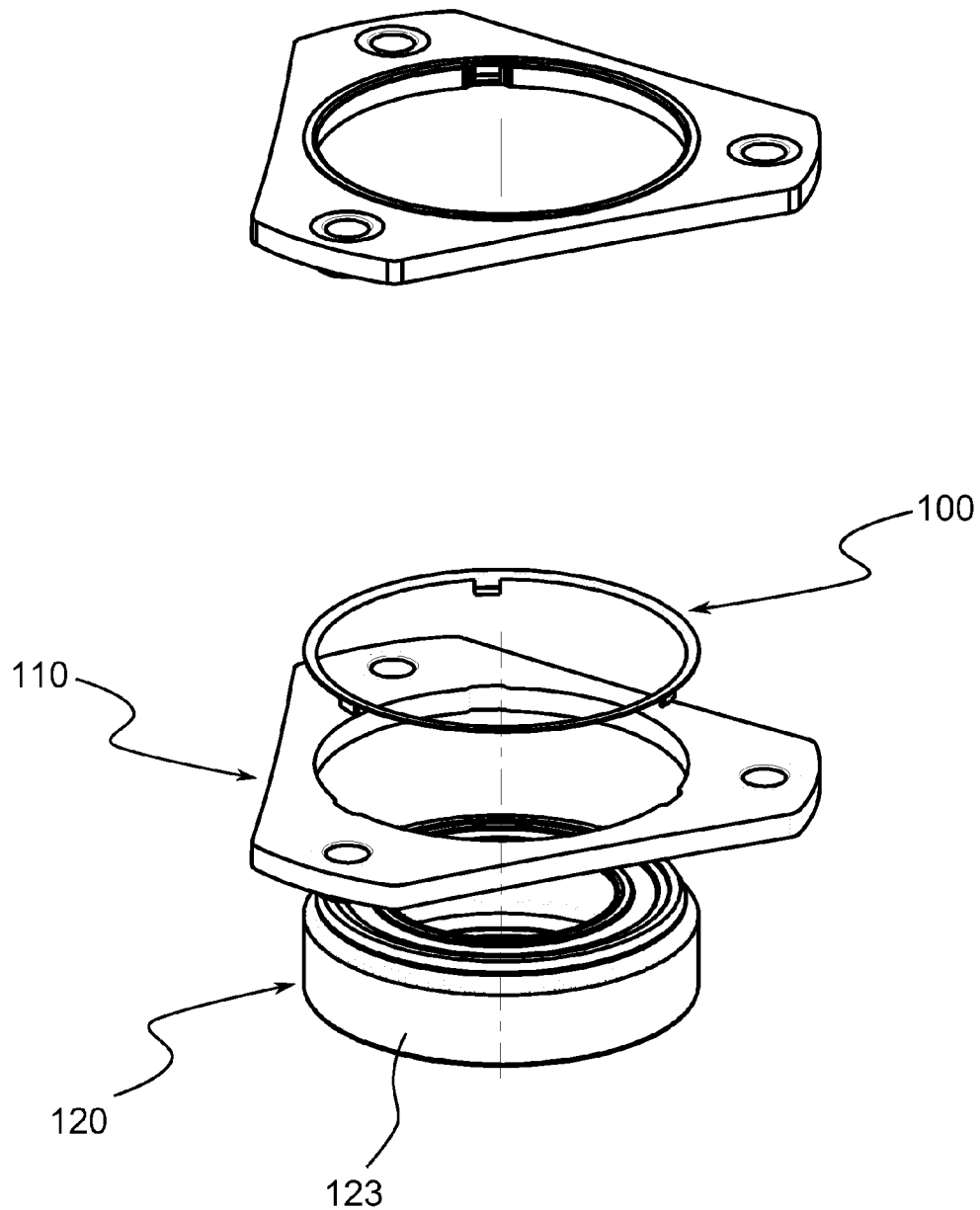
FIG. 4 shows various perspective views of a rolling-element bearing, holding element, and centering assembly according to FIGS. 1 to 3.

According to the exemplary embodiment shown in FIG. 3 of the centering assembly 100, the individual centering elements 101a, 101b, and 101c can be disposed on a ring 102 corresponding to the circumference of the circular receiving opening 111, so that upon setting the ring 102 onto the receiving opening 111, the centering elements 101a, 101b, and 101c can engage into the recesses 114a, b, and 114c provided therefor in the edge region of the receiving opening 111, as is shown in the exploded view of FIG. 4. The ring 102 and the centering elements 101a, 101b, 101c can thus be formed in a one-piece manner.

According to exemplary embodiments of the present invention, the at least three centering elements 101a, 101b, and 101c are each formed to be able to be deformed elastically radially-outward upon contact with an outer surface of the bearing outer ring 123, and to center the bearing outer ring 123 in the circular receiving opening 111 by using a radially-inward-directed restoring force resulting therefrom. For this purpose the centering elements 101a, 101b, and 101c, as well as the ring 102, can for example be manufactured from a metal which is elastically deformable, in particular in the radial direction, such as for example a spring steel plate, or from an elastically deformable plastic.

In particular, the at least three centering elements 101a, 101b, and 101c interact with the bearing outer ring 123 in a portion of its axial extension having a reduced outer diameter. For this purpose, the bearing outer ring 123, which is also clear in FIG. 1 (above), has an encircling radial projection 124 in an axial end region of its reduced outer diameter.

According to the first embodiment shown in FIGS. 1 to 4, each of the centering elements 101a, 101b, and 101c can have a first resilient and radially-inwardly-projecting projection 103 in the form of a hook on a side facing towards the bearing outer ring 123, or facing away from the edge of the receiving opening 111, which projection 103 can interact with the radially-outwardly-projecting projection 124 of the bearing outer ring 123 upon disposing the respective centering elements 101a, 101b, and 101c in the recesses 114a, b and 114c provided therefor and inserting the bearing outer ring 123, in order to hold the bearing outer ring as captively as possible in the (flange-type) holding element 110.

According to the first embodiment shown in FIGS. 1 to 4, the interaction of the hook 103 with the radial projection 124 of the bearing outer ring 123 consists of a latching of the radially-inwardly-projecting hook 103 under an edge of the radially-outwardly-projecting projection 124, so that both the centering elements 101a, 101b, and 101c and the bearing outer ring 123 are in each case captively disposed in the holding element 110. Here "captively" means a fixing in the axial direction, i.e. in the direction of the axis of rotation of the bearing 120. As is in particular shown in the upper part of FIG. 1, an axial displacement of the bearing outer ring 123 is prevented on the one hand by a shoulder 125 of the bearing outer ring 123, which shoulder 125 results from the reduced outer diameter, and on the other hand by the hook 103 of a centering element 101a, 101b, and 101c latched under the radial projection 124 of the bearing outer ring 123. For this purpose the radial projection 124 of the bearing outer ring 123 can either be encircling around the entire circumference. According to other exemplary embodiments, at least three individual, separate radial projections 124 of the bearing outer ring 123 can be provided, which radial projections 124 are provided so as to be complementary to the centering elements 101a, 101b, and 101c.

As is clear in the upper part of FIG. 1, the centering assembly including the at least three centering elements 101a, 101b, and 101c effects a radial centering of the bearing 120 or of the bearing outer ring 123 within the receiving opening 111 of the holding element 110, so that a substantially uniform radial clearance is obtained between the outer surface of the bearing outer ring and the edge of the receiving opening 111. Due to this clearance or the spacing, when the locating bearing is mounted on a housing, sufficient clearance still remains between the outer surface of the bearing outer ring 123 and the opposing outer surface of the receiving opening 111 to compensate for tolerances with respect to a relative position of a to-be-supported shaft by a (slight) radial displacement of the bearing ring 123 within the receiving opening 111, whereby large radial contact forces of the outer surfaces of the bearing ring 123 and the receiving opening 111 in the radial direction can be avoided.

A first embodiment of a bearing assembly having been described in the foregoing with reference to FIGS. 1 to 4, still further possible exemplary embodiments will be explained in the following with reference to the further Figures. Due to many structural similarities between various exemplary embodiments, only different functional elements will be discussed in more detail in the following description, whereas elements already described will not be explained in more detail.

Figure 5:
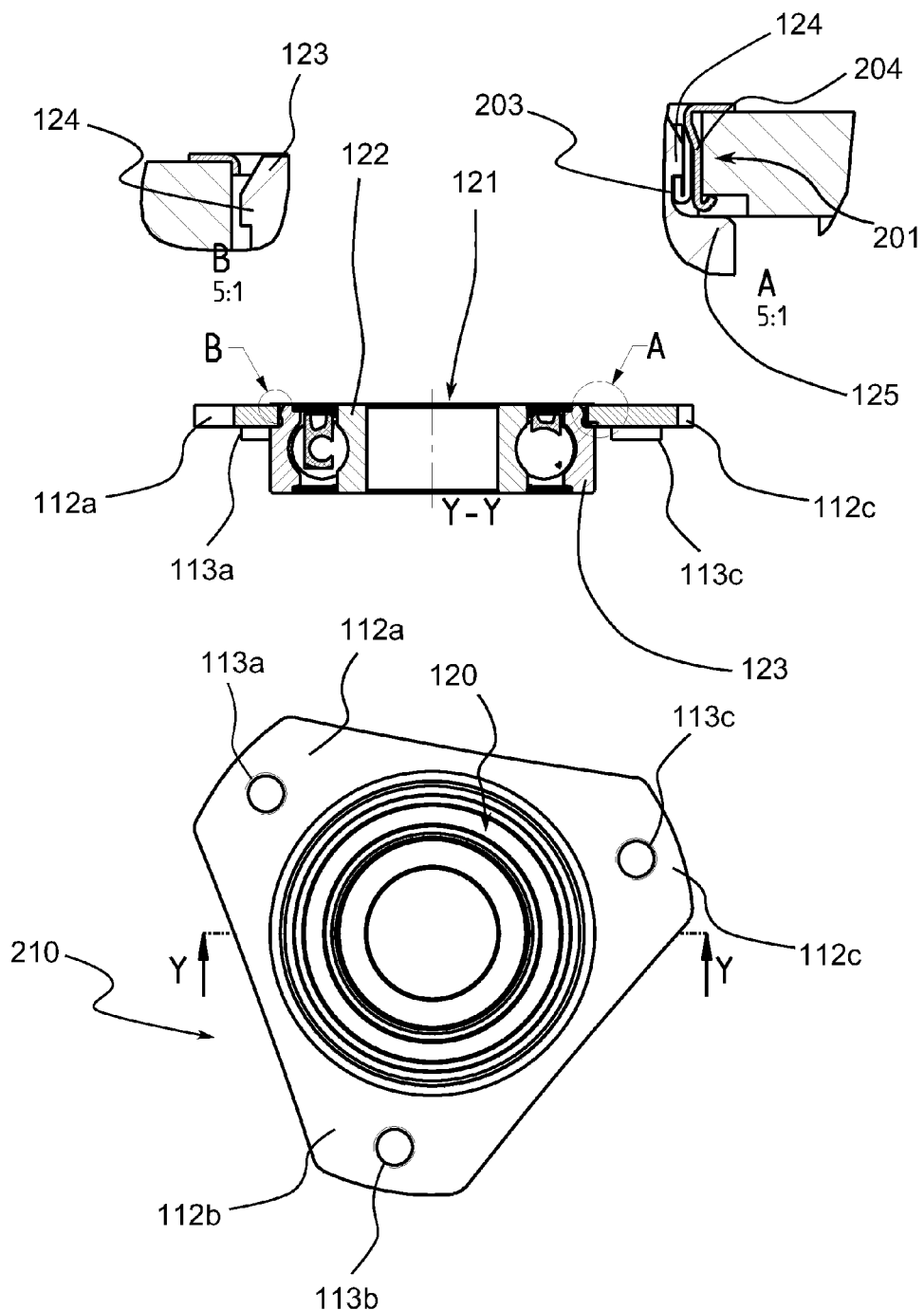
FIG. 5 shows various views of a rolling-element bearing disposed centered in a holding element using a centering assembly, according to a second exemplary embodiment of the present invention.
Figure 6:
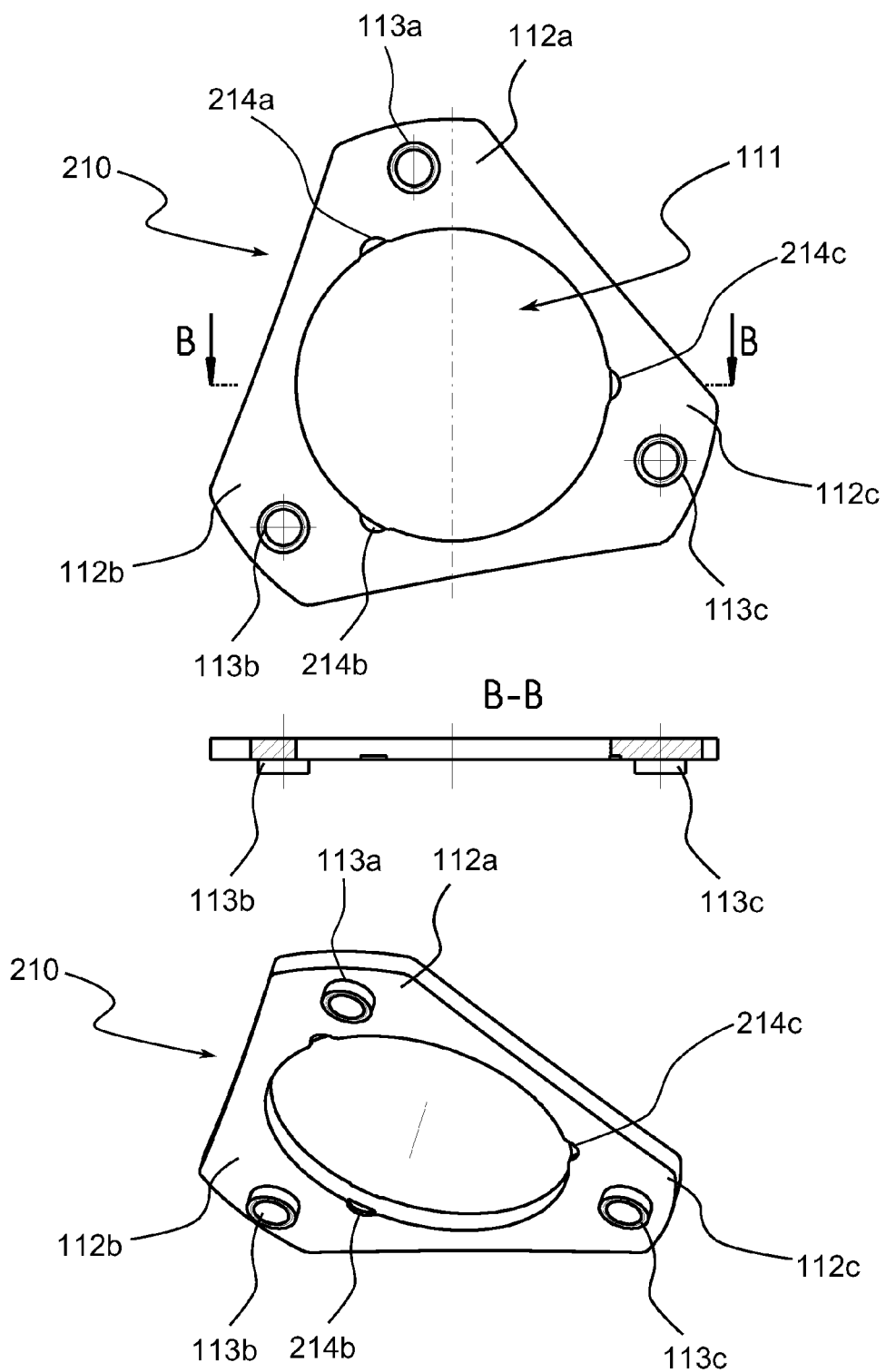
FIG. 6 shows various views of the holding element according to FIG. 5.
Figure 7:
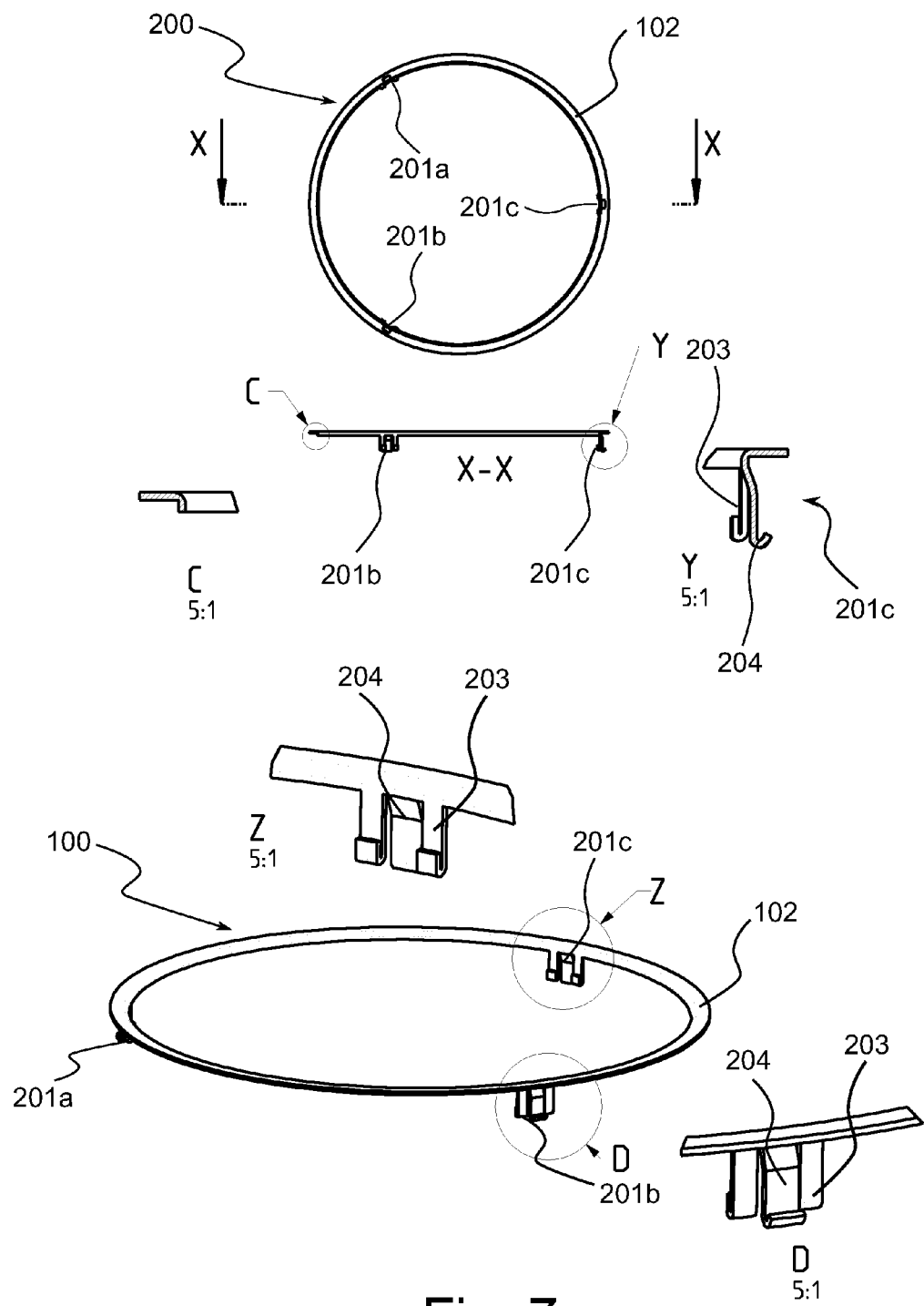
FIG. 7 shows various views of the centering assembly including three centering elements according to FIG. 5 disposed in a ring shape and which are each elastically deformable in the radial direction.
Figure 8:
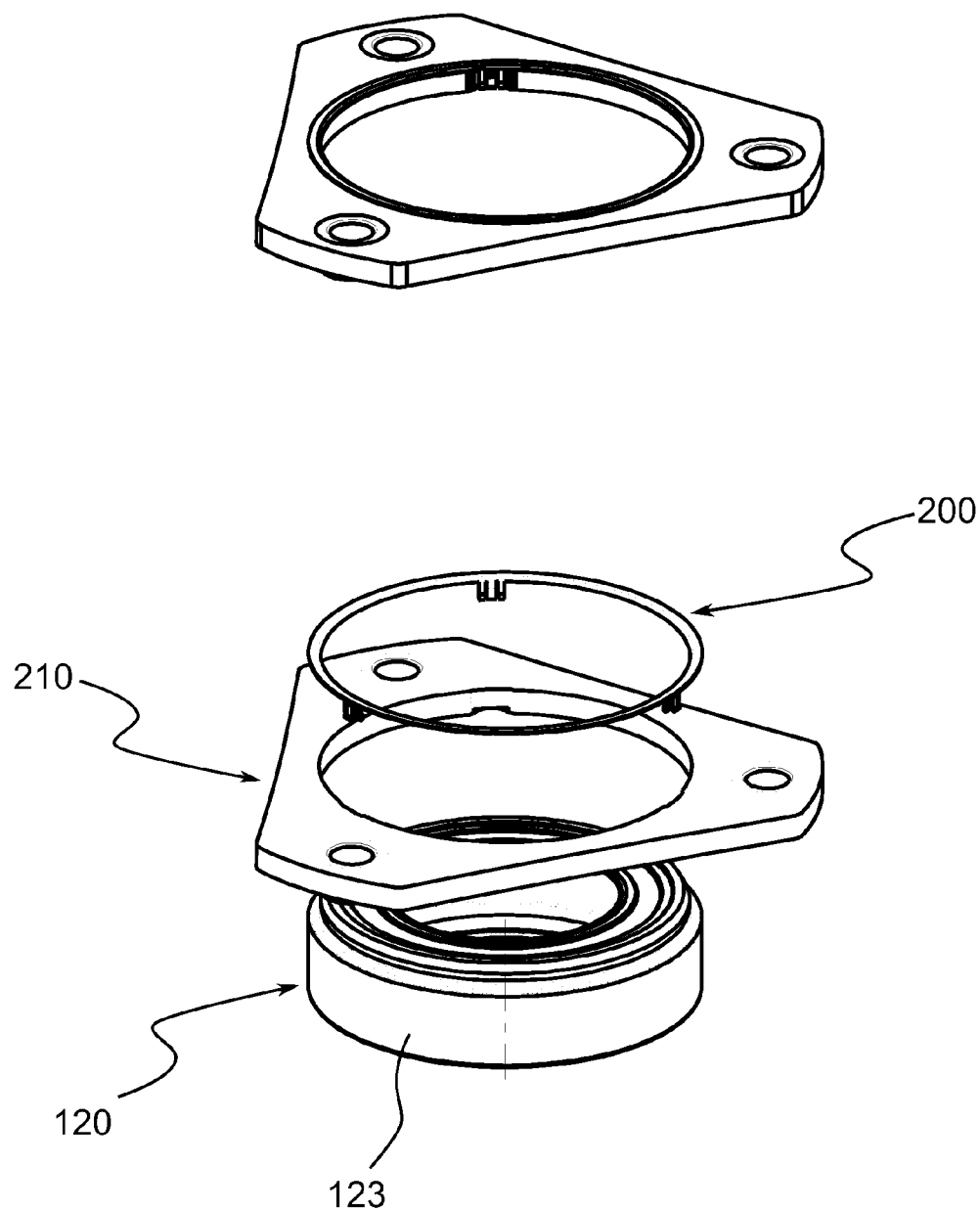
FIG. 8 shows various perspective views of a rolling-element bearing, holding element, and centering assembly according to FIGS. 5 to 7.

FIGS. 5 to 8 show a second possible embodiment of a bearing assembly. FIG. 5 shows various views of the second bearing assembly, wherein the bearing 120 can be held centered in a second exemplary embodiment of a holding element 210 by using a second exemplary embodiment of a centering assembly 200. The holding element 210 provided therefor is shown in FIG. 6 in various views in more detail, whereas the centering assembly 200 is shown in FIG. 7 in various views more precisely.

As is apparent in particular from FIG. 5 (top) and FIG. 6, the holding element 210 differs from the holding element 110 by the design of its recesses 214a, 214b, and 214c, which are matched to the at least three centering elements 201a, 201b, and 201c of the centering assembly 200, which centering elements 201a, 201b, and 201c are each elastically deformable in the radial direction. The recesses 214a, 214b, and 214c are introduced only on an end in the edge region of the receiving opening 111, which end axially faces towards the bearing 120, so that radially-inwardly-projecting projections can also be formed by the recesses 214a, 214b, and 214c in the edge region of the receiving opening 111. According to this exemplary embodiment, these radially-inwardly-projecting projections or recesses 214a, 214b, and 214c can now also interact with correspondingly modified centering elements 201a, 201b, and 201c of the centering assembly 200, as is particularly apparent from FIG. 5 (top). For this purpose, in addition to a radially-inwardly-oriented hook 203, each of the centering elements 201a, 201b, and 201c also has a radially-outwardly-oriented hook 204 that is resilient in the radial direction. In other words, each of the centering elements 201a, 201b, and 201c thus has an additional resilient hook 204 on a side facing towards the edge region of the receiving opening 111, which hook 204, when the centering element 201a, 201b, or 201c is disposed in one of the recesses 214a, 214b, or 214c provided therefor, can latch in the edge region under a radially-inwardly-projecting projection of a recess 214a, 214b, and 214c in order to captively hold the centering element 201a, 201b or 201c in the holding element 210 (see FIG. 7 and FIG. 8).

Here the centering elements 201a, 201b, or 201c and/or the ring also can be formed of course from a spring steel plate or elastic plastic.

As compared to the first embodiment, the bearing assembly described with reference to FIGS. 5 to 8 is capable of effecting a still-further-improved axial fixing of both the radially-centered bearing 120 and the centering assembly 200.

Figure 9:
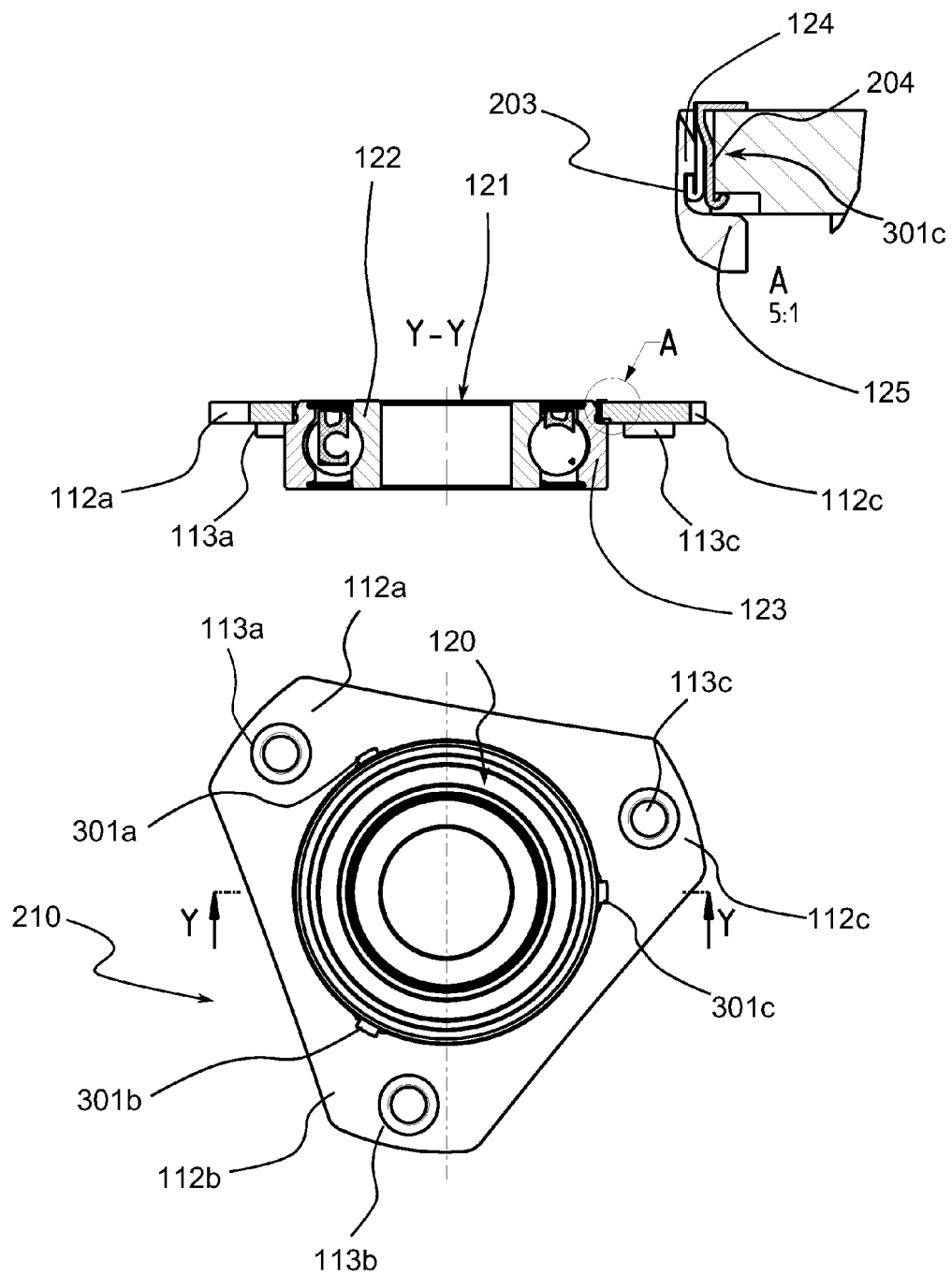
FIG. 9 shows various views of a rolling-element bearing disposed centered in a holding element using a centering assembly, according to a third exemplary embodiment of the present invention.
Figure 10:
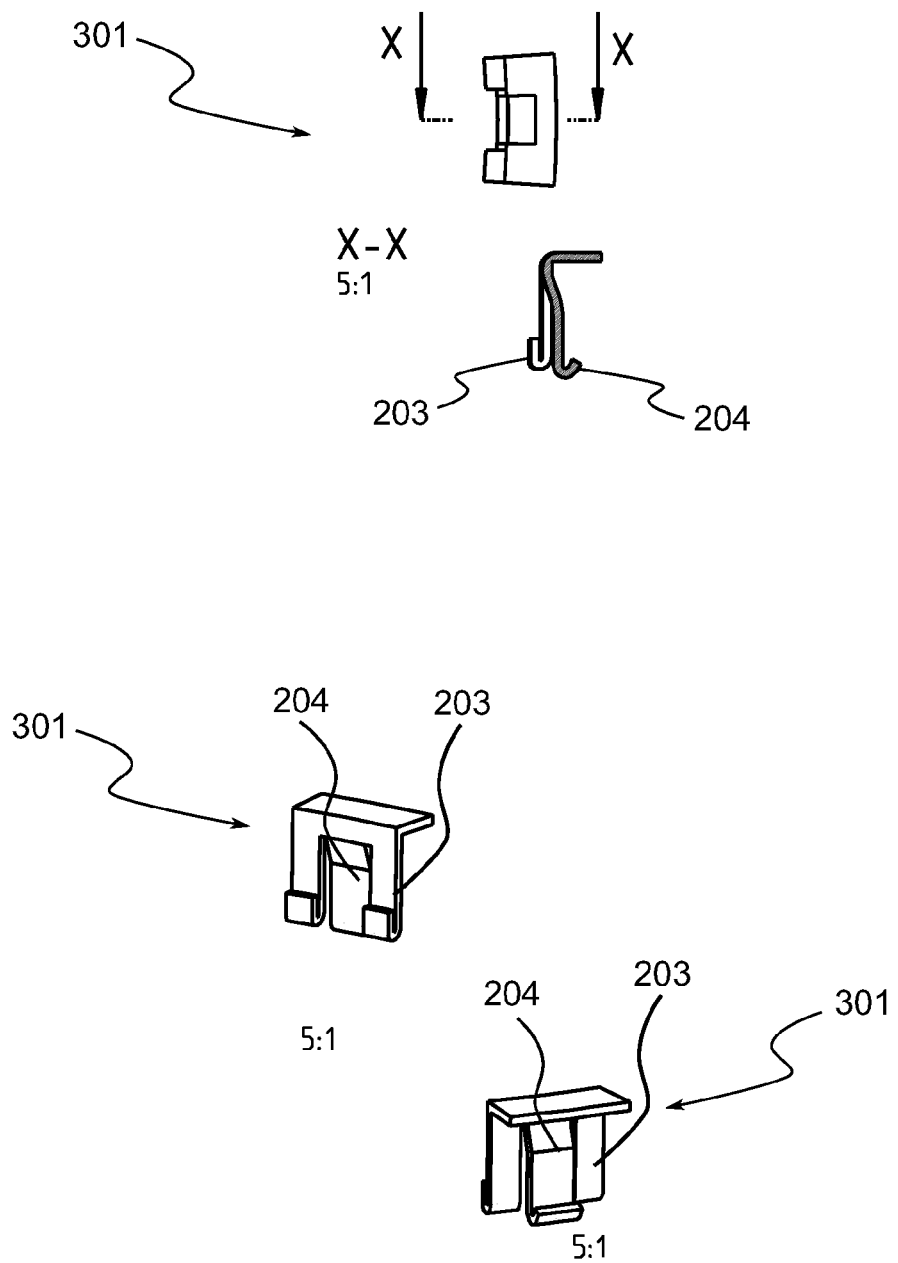
FIG. 10 shows various views of the centering assembly including separate centering elements according to FIG. 9 which are each elastically deformable in the radial direction.
Figure 11:
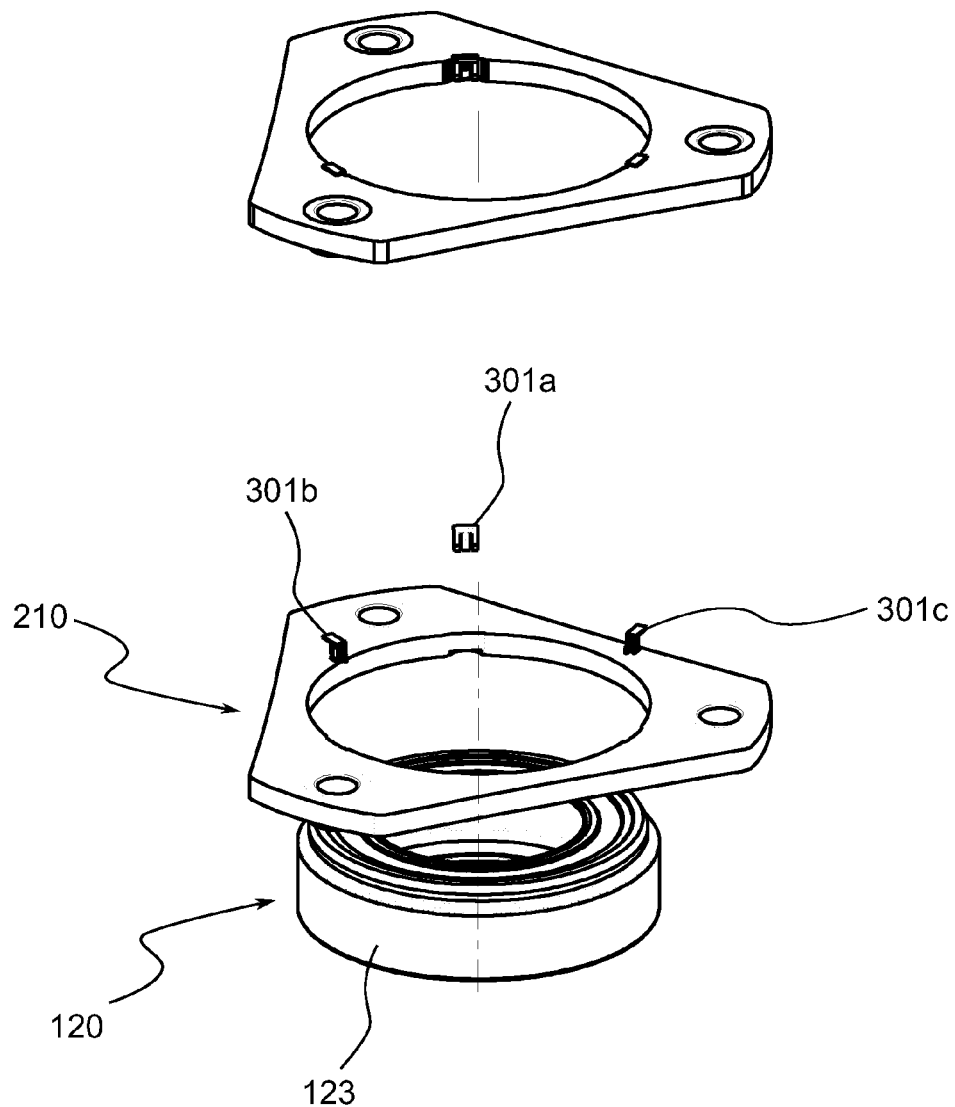
FIG. 11 shows various perspective views of a rolling-element bearing, holding element, and centering assembly according to FIGS. 9 and 10.

A further exemplary embodiment of the present invention is shown in FIGS. 9 to 11. A bearing assembly is shown there, wherein the bearing 120 according to a third exemplary embodiment of the present invention can be held centered in the holding element 210 using a further centering assembly. The bearing 120 and the holding element 210 having already been explained in detail, they will not be discussed further in the following.

Compared to the centering assemblies 100, 200, in which the respective centering elements 101a, 101b, 101c or 201a, 201b, 201c are each disposed on the ring 102 that connects them, in the centering assembly shown with reference to FIGS. 9 to 11, no ring connecting the centering elements 301a, b, c is provided. Instead, the at least three centering elements 301a, b, and 301c are separate, i.e. separated from one another. In this case, the individual centering elements 301a, b, and 301c can be formed in the same way as the centering elements 101 or 102 disposed on the ring 102. This is clear based on FIG. 10, in which separate centering elements 301a, b, and 301c are shown, which correspond for example to the centering elements 201a, 201b, and 201c.

A centering assembly including separate centering elements 301a, b, c, can for example be advantageous if certain installation situations do not allow an arrangement on a ring 102, for example if a subsequent centering is to take place following mounting of the bearing in confined bearing housings. Moreover, material costs for the centering assembly also can of course be saved.

Further exemplary embodiments of the present invention, similar to the last two described exemplary embodiments, are shown in FIGS. 12-18.

Figure 13:
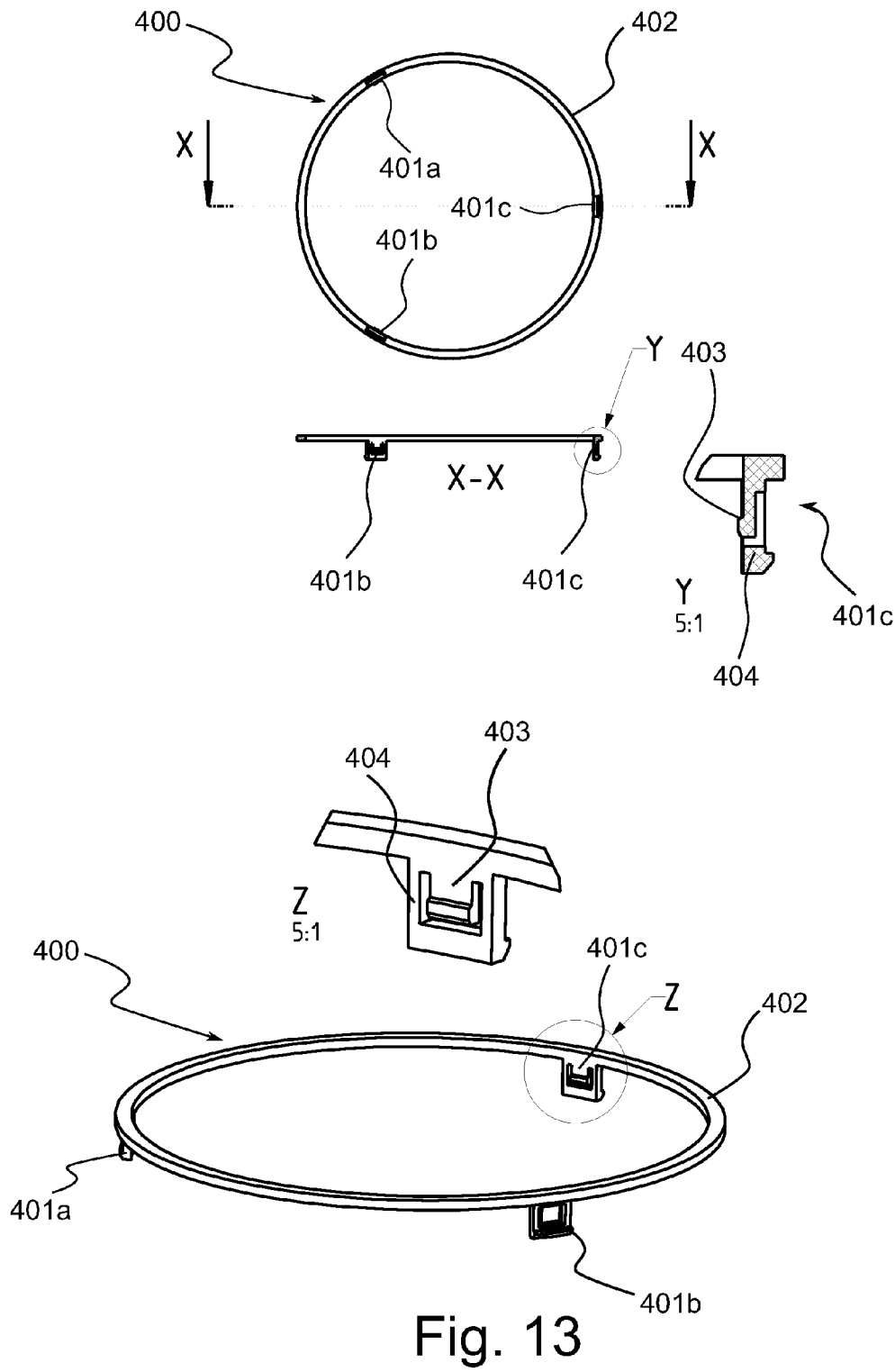
FIG. 13 shows various views of the centering assembly including three centering elements according to FIG. 12 disposed in a ring shape and which are each elastically deformable in the radial direction.
Figure 14:
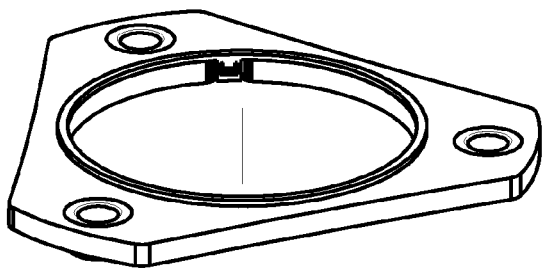
FIG. 14 shows various perspective views of rolling-element bearing, holding element, and centering assembly according to FIGS. 12 and 13.
Figure 14:
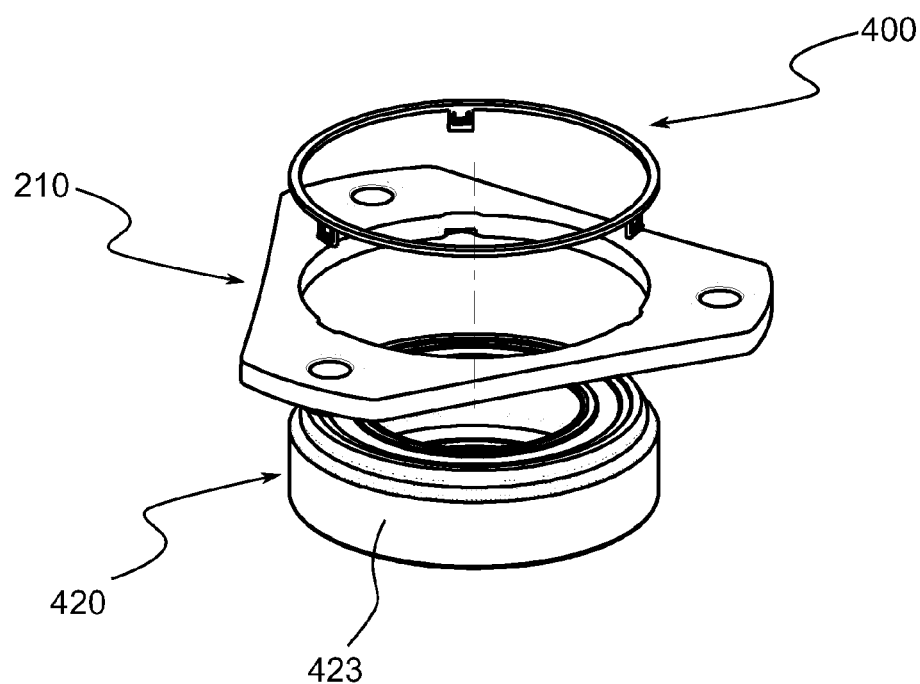
Figure 15:
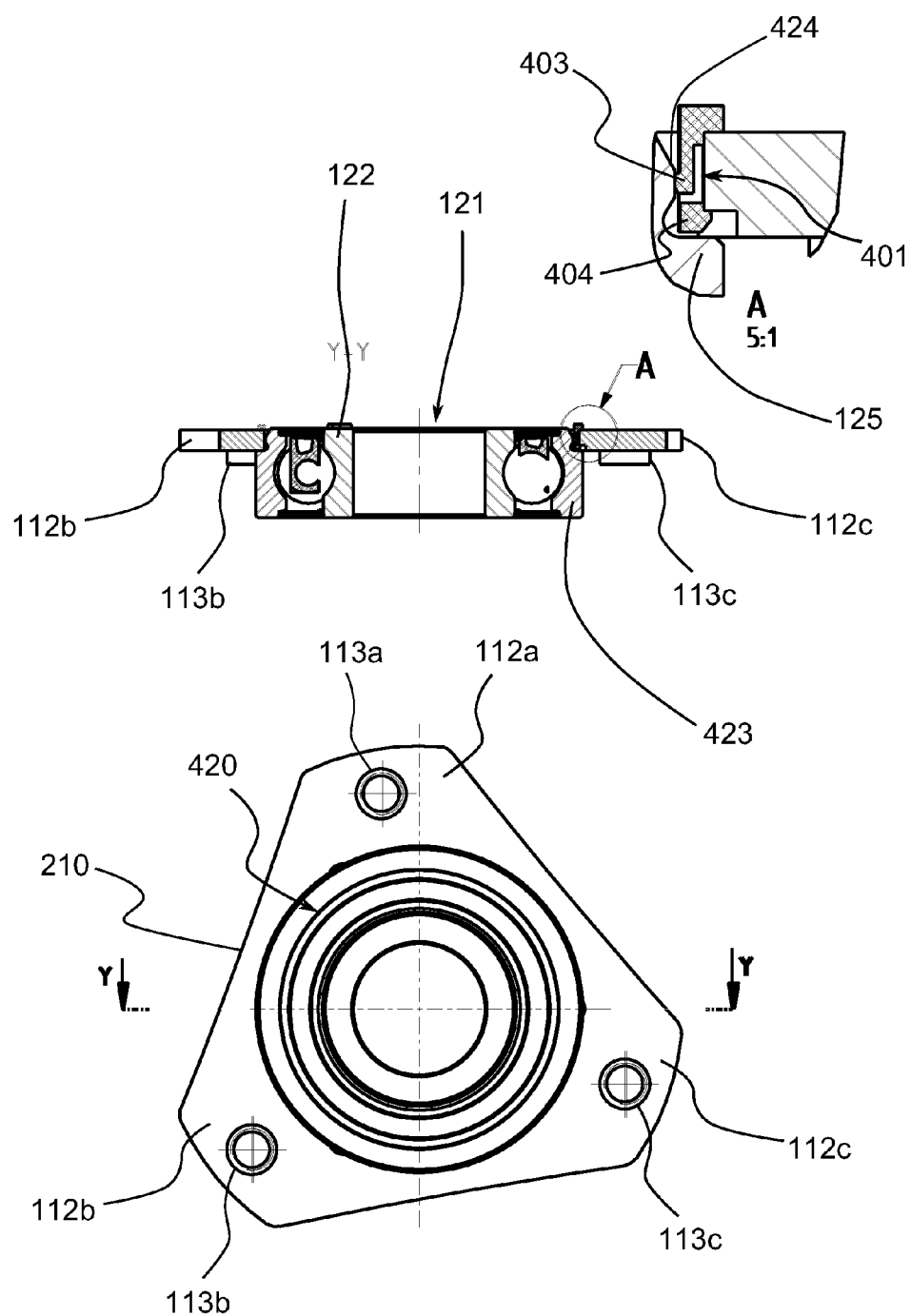
FIG. 15 shows various views of a rolling-element bearing disposed centered in a holding element using a centering assembly, according to a fifth exemplary embodiment of the present invention.
Figure 16:
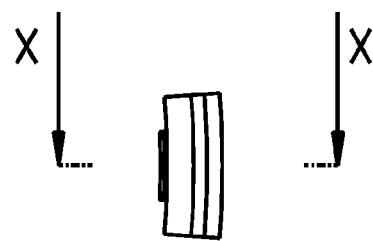
FIG. 16 shows various views of the centering assembly including separately disposed centering elements according to FIG. 15 which are each elastically deformable in the radial direction.
Figure 16:
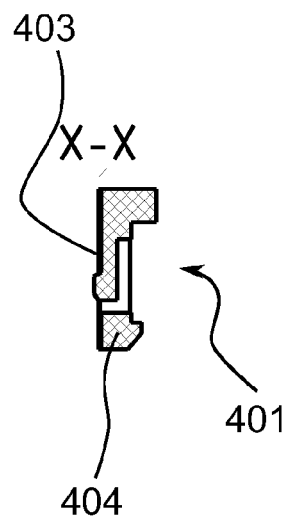
Figure 16:
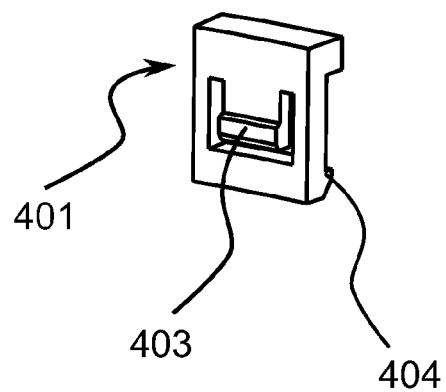
Figure 17:
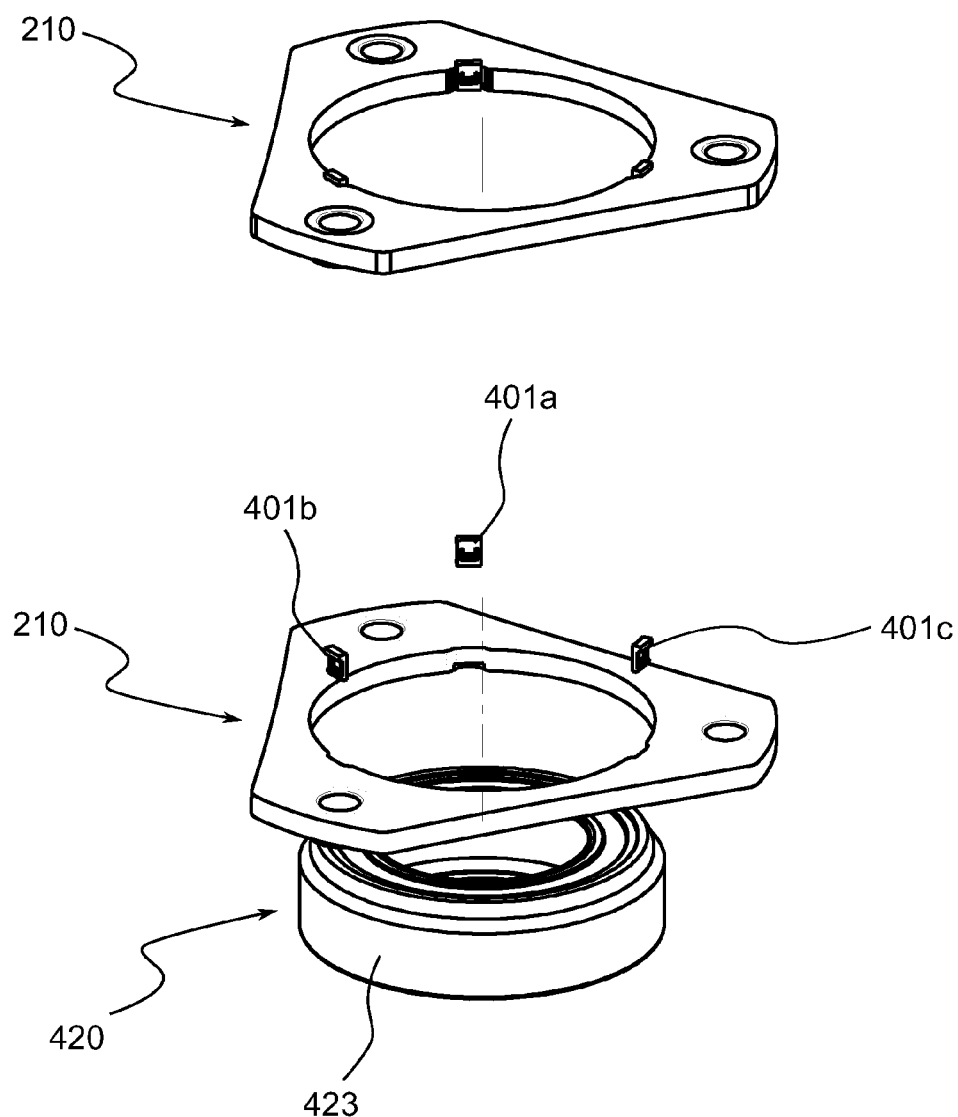
FIG. 17 shows various perspective views of rolling-element bearing, holding element, and centering assembly according to FIGS. 15 and 16.

The fourth exemplary embodiment shown with reference to FIGS. 12 to 14 differs from the second embodiment explained with reference to FIGS. 5 to 8 on the one hand in the design of the bearing or its radial projection, and on the other hand in the centering assembly.

The bearing 420 includes a bearing outer ring 423 having a radially-outwardly-oriented projection 424 in its reduced-diameter axial end region. In contrast to the previously described exemplary embodiments, the radially-outwardly-projecting projection 424 has a pronounced, radially-outwardly-oriented end surface, see FIG. 12 (top).

A centering assembly 400 provided according to this embodiment, i.e. its individual centering elements 401a, b, and 401c, as well as the ring 402 that connects these, can be manufactured from a synthetic material, in particular a plastic. Here the centering assembly 400 manufactured from plastic can for example be manufactured using an injection molding process. Furthermore, as is clear particularly from FIG. 13, a radially-inwardly-oriented projection 403 and a radially-outwardly-oriented projection 404 of a centering element 401a, b, and 401c, are formed differently in comparison to previous embodiments. According to this embodiment, pronounced hooks are not provided. Rather, the radially-inwardly-oriented projection 403 has a pronounced, radially-inwardly-oriented end surface.

Figure 12:
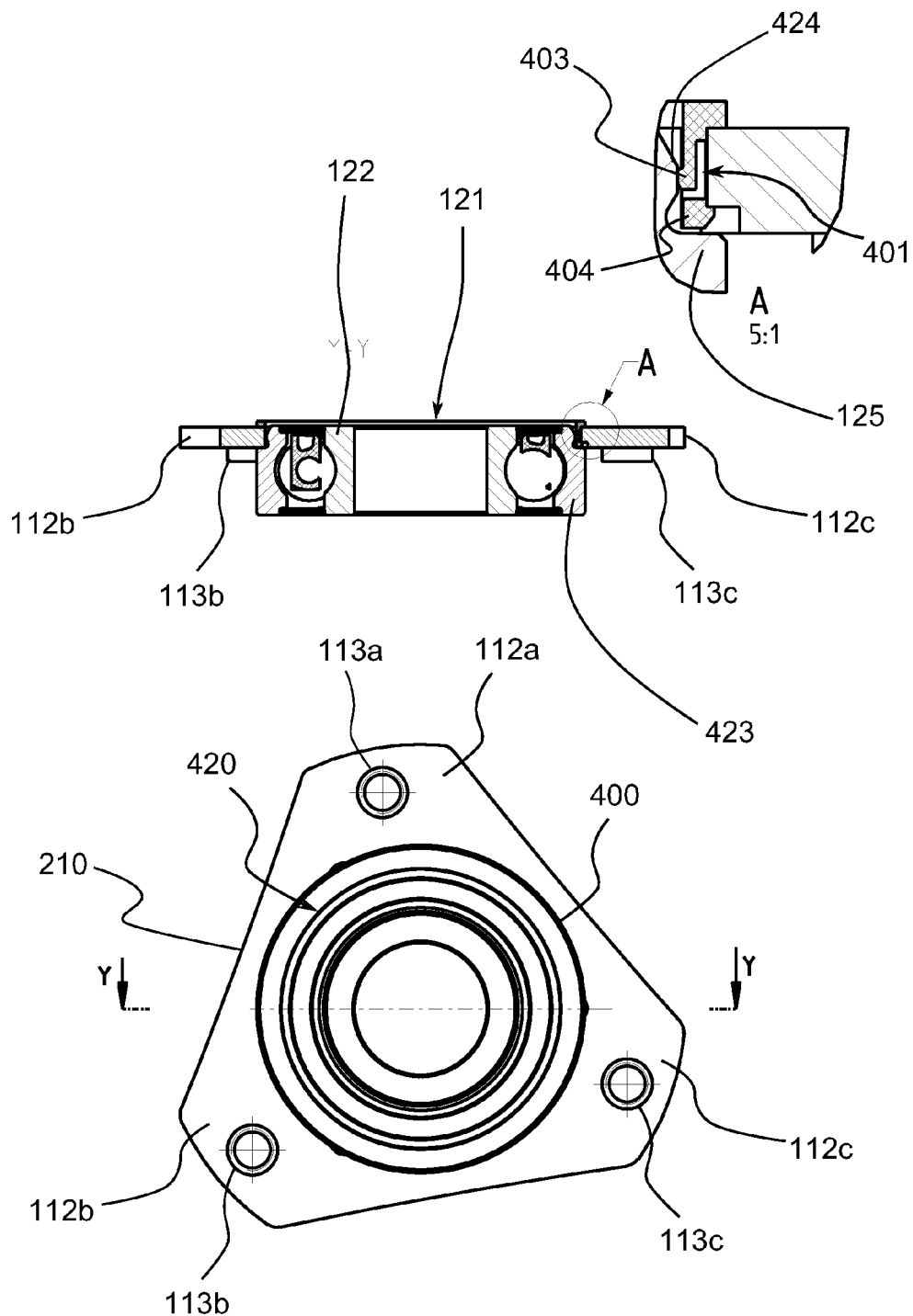
FIG. 12 shows various views of a rolling-element bearing disposed centered in a holding element using a centering assembly, according to a fourth exemplary embodiment of the present invention.

As is shown in FIG. 12 (top), the radially-inwardly-oriented projection 403 of a centering element 401 need not necessarily latch under a radially-outwardly-oriented projection 424 of the bearing outer ring 423. Instead, the radiallyinwardly-oriented projection 403 of a centering element 401 can also interact with the radially-outwardly-oriented projection 424 of the bearing outer ring 423 such that the end surfaces of the radial projections 403 and 424 are pressed onto each other. In this way a friction-fit connection results, which can also effect an axial fixing of the bearing 420 in the holding element 210.

As has been previously explained, the at least three centering elements 401a, b, and 401c here also need not necessarily be disposed on the ring 402 of the centering assembly 400. As is shown with reference to FIGS. 15 to 17, the individual centering elements 401a, b, and 401c in a centering assembly can also be introduced separately from one another, i.e. physically separated, into the recesses of the holding element 210 provided therefor.

In order to captively fix the bearing outer ring 423 in a holding element, the individual centering elements of a centering assembly can also have shapes other than those described previously, as is shown with reference to FIGS. 18 to 23.

As has already been described, the radially-inwardly-oriented projection of a centering element need not necessarily be formed as a hook. As also shown in FIGS. 18 to 23, in particular in FIGS. 18, 20, 21, and 23, a radially-inwardly-oriented projection 503 can also be formed trapezoidal in shape with an end surface which can form a contact surface for friction-fit connecting with an end surface of the radially-outwardly-projecting projection 424 of the bearing outer ring 423. The friction-fit connection is achieved using a radially-inwardly directed restoring force produced by the elastic deformation of the centering element.

Figure 18:
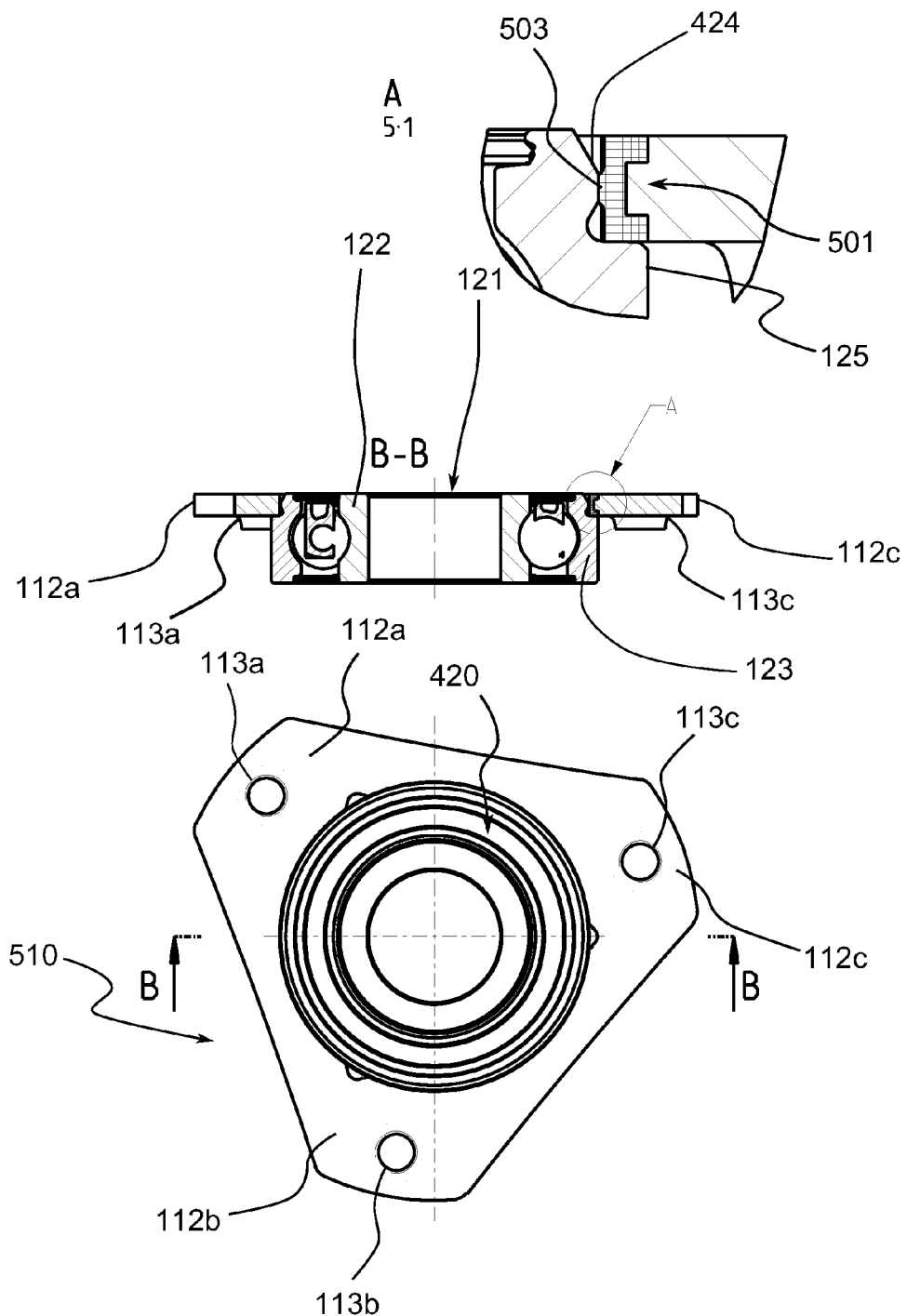
FIG. 18 shows various views of a rolling-element bearing disposed centered in a holding element using a centering assembly, according to a sixth exemplary embodiment of the present invention.
Figure 19:
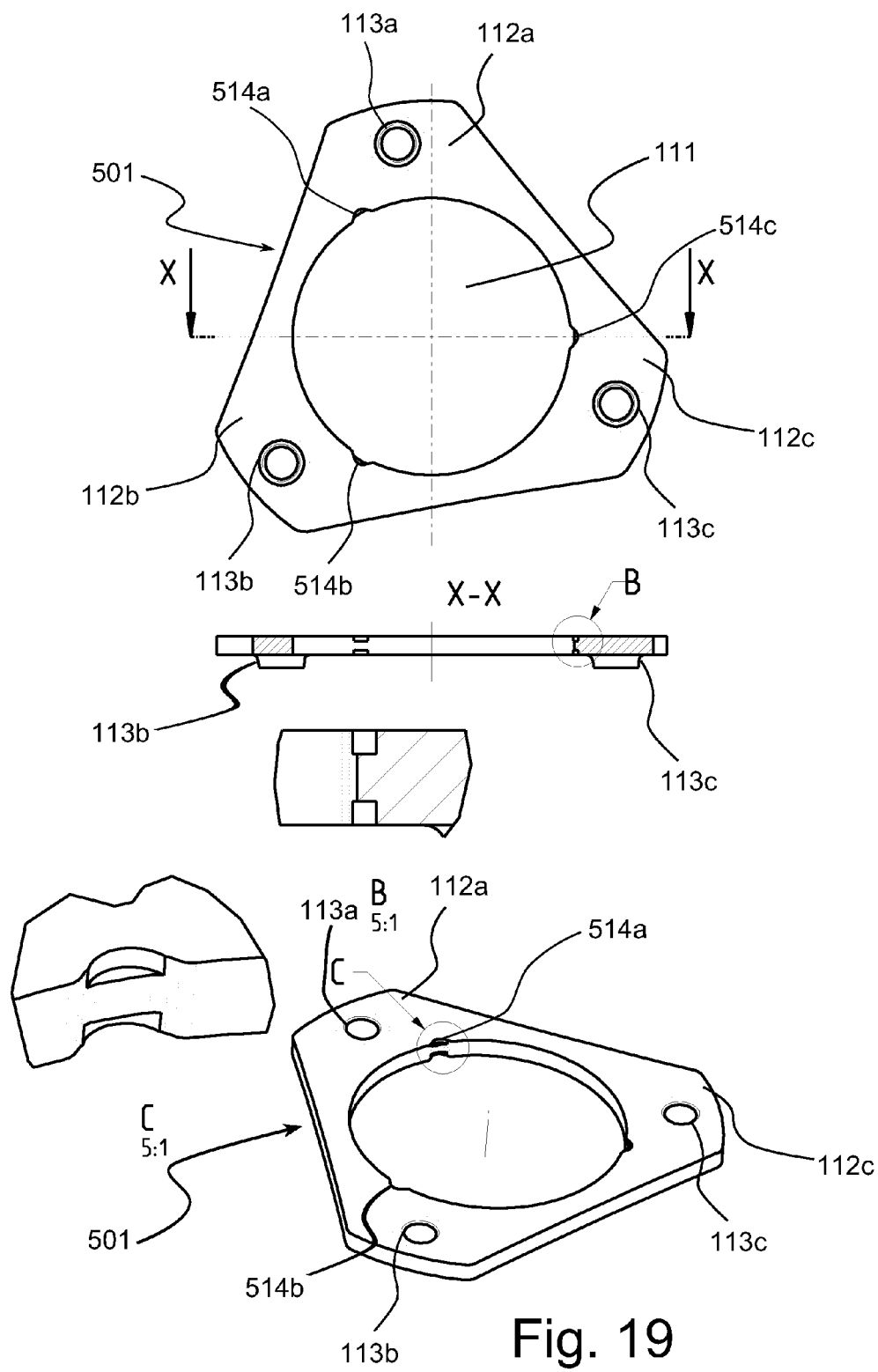
FIG. 19 shows various views of the holding element according to FIG. 18.
Figure 20:
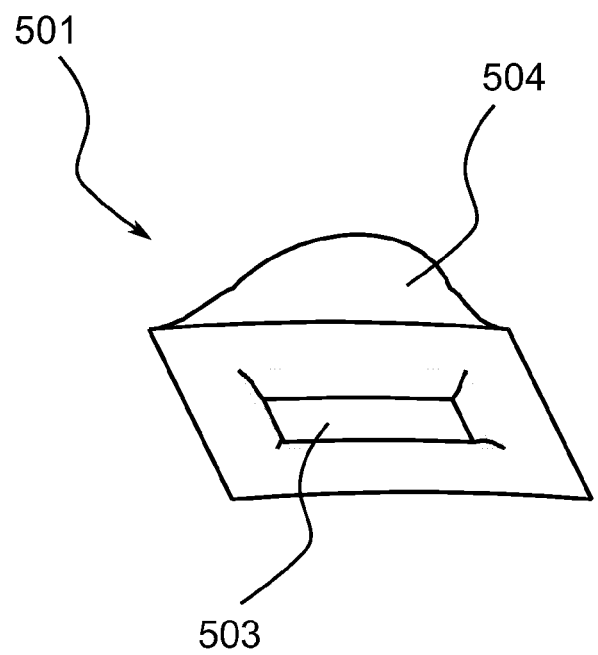
FIG. 20 shows various views of the centering assembly including separate centering elements according to FIG. 18 which are each elastically deformable in the radial direction.
Figure 20:
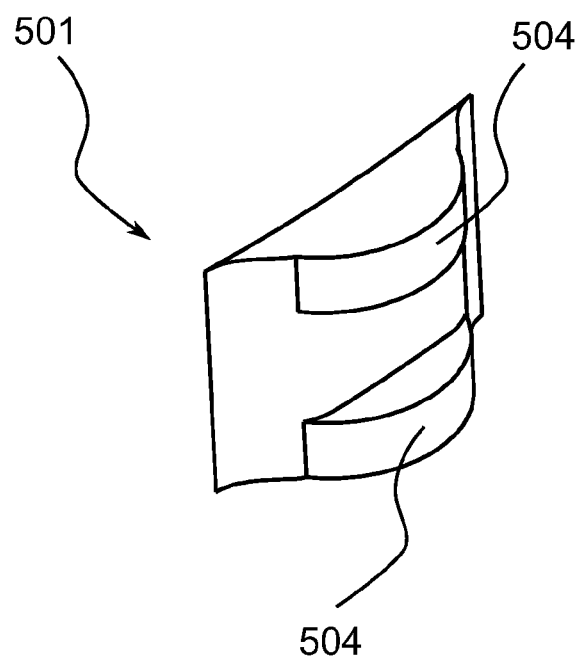
Figure 21:
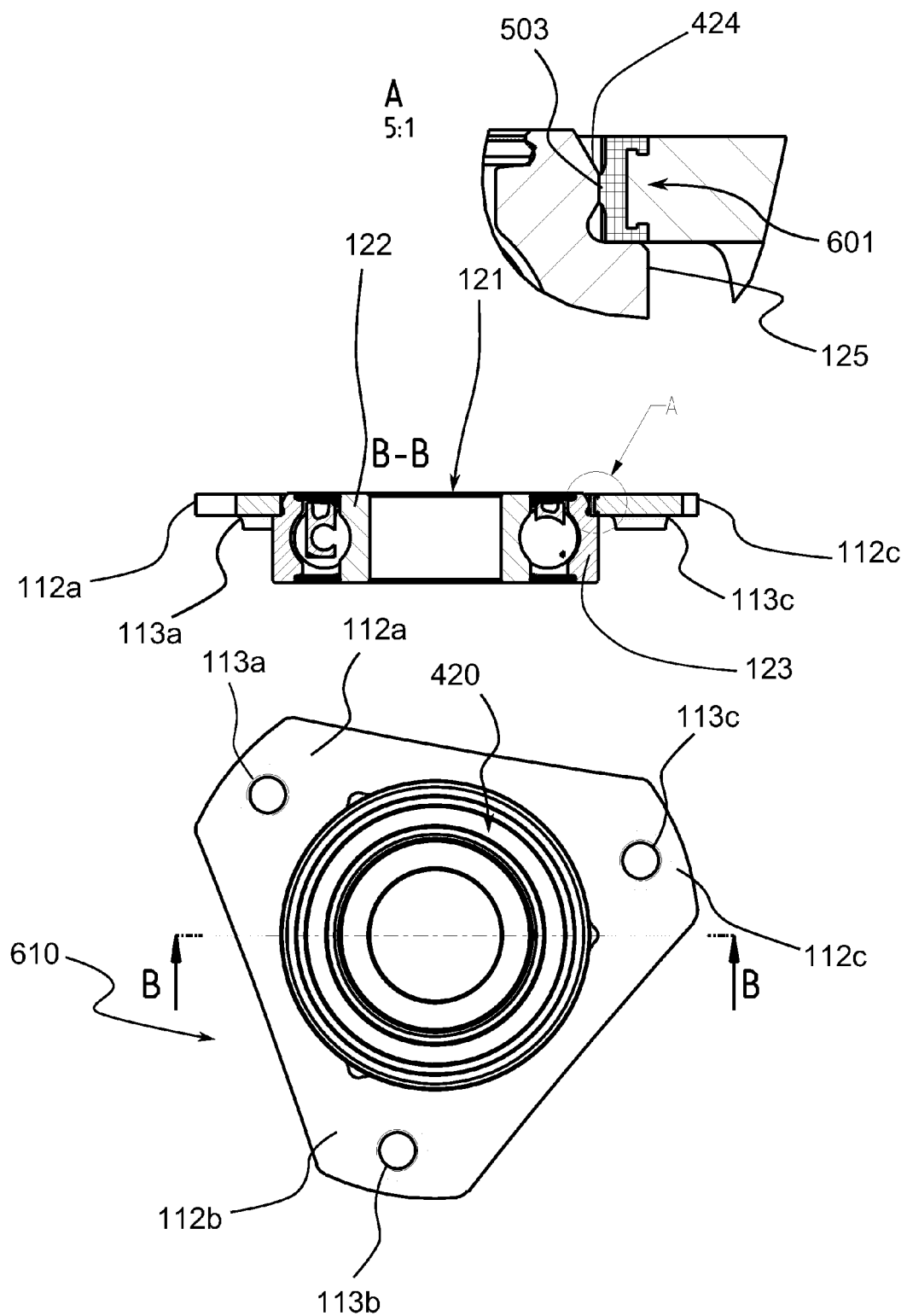
FIG. 21 shows various views of a rolling-element bearing disposed centered in a holding element using a centering assembly, according to a seventh exemplary embodiment of the present invention.
Figure 22:
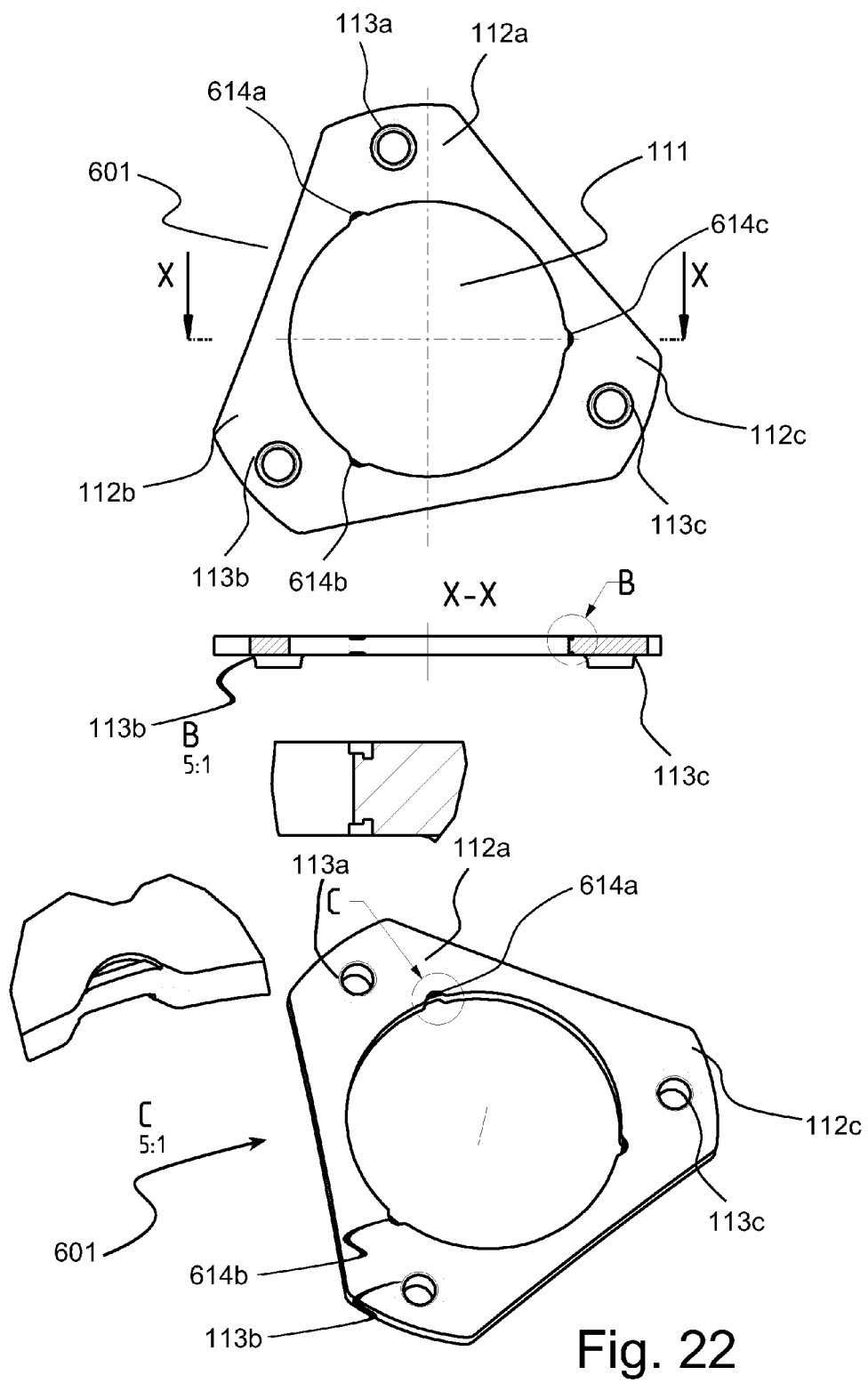
FIG. 22 shows various views of the holding element according to FIG. 21.
Figure 23:
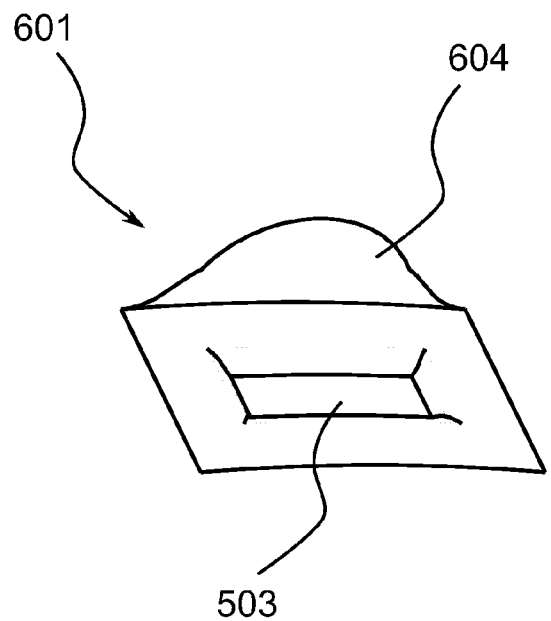
FIG. 23 shows various views of the centering assembly including separate centering elements according to FIG. 21 which are each elastically deformable in the radial direction.
Figure 23:
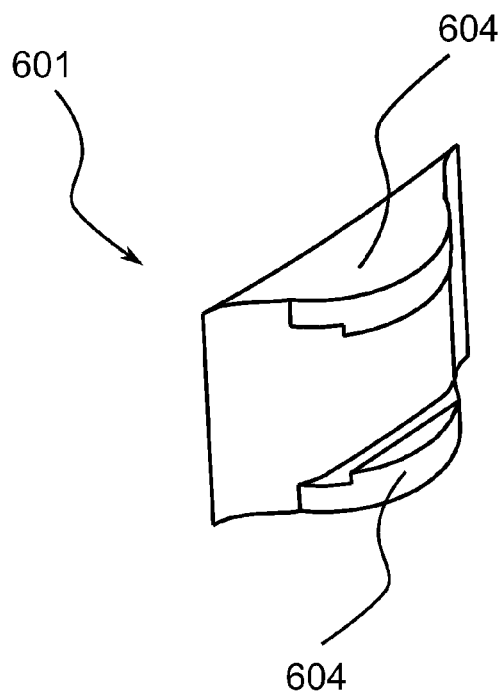

In order to place the individual centering elements 501 or 601 in the edge region of the receiving opening 111, the centering elements 501 or 601 can for example each have resilient U- or Ω-shaped longitudinal sections and/or U- or Ω-shaped radially-outwardly-projecting projections 504, 604, as shown in particular in FIGS. 18 (top), 20 (bottom), 21 (top), and 23 (bottom). Accordingly, recesses 514, 614 provided for such centering elements can be formed in a complimentary manner, i.e. for example with groove- or T-shaped longitudinal sections or recesses, so that the centering elements 501 or 601 can enter into an interference-fit connection with the recesses 514 or 614 provided therefor (see also FIGS. 19, 20 and 22, 23). For this purpose, the U- or Ω-shaped radially-outwardly-projecting projections 504, 604 can be elastically deformable in the axial direction, in order to, for example, make possible a latching of the projections 604 into the recesses 614.

While various exemplary embodiments of the present invention have been described with reference to separate Figures, other exemplary embodiments of the present invention also provide combinations of the described exemplary embodiments. In order to obtain interference- and/or friction-fit connections between various elements of the bearing assembly, different profiles can be provided which can differ from the profiles described in the present specification, however fulfill substantially the same function.

REFERENCE NUMBER LIST

100 First centering assembly
101 Centering element
102 Centering ring
103 Radially-inwardly-oriented projection of a centering element
110 First holding element
111 Receiving opening
112 Fixing section
113 Threaded bore
114 Recess for centering element
120 Bearing
121 Bearing bore for shaft
122 Bearing inner ring
123 Bearing outer ring
124 Radially-outwardly-oriented projection of the bearing outer ring
125 Shoulder
200 Second centering assembly
201 Centering element
203 Radially-inwardly-oriented projection of a centering element
204 Radially-outwardly-oriented projection of a centering element
210 Second holding element
301 Centering element
400 Fourth centering assembly
401 Centering element
402 Centering ring
403 Radially-inwardly-oriented projection of a centering element
404 Radially-outwardly-oriented projection of a centering element
420 Bearing
423 Bearing outer ring
424 Radially-outwardly-oriented projection of the bearing outer ring
501 Centering element
503 Radially-inwardly-oriented projection of a centering element
504 Radially-outwardly-oriented projection of a centering element
510 Holding element
514 Recess for centering element
601 Centering element
604 Radially-outwardly-oriented projection of a centering element
610 Holding element
614 Recess for centering element

The invention claimed is:

1. A device for centering a bearing ring, comprising:
a bearing holding element defining a circular opening configured to receive a bearing ring;
at least three centering elements that are each elastically deformable in a radial direction, the centering elements being configured to be respectively disposed in recesses defined in and around a circumferential edge of the circular opening and being configured to center the bearing ring upon its insertion into the circular opening, wherein the centering elements are formed from a spring steel plate,
wherein a resilient hook is disposed on each centering element on a side of the centering device configured to face towards the circumferential edge of the circular opening, each resilient hook being configured to latch under a radially inwardly projecting projection formed by the recesses of the holding element when the centering elements are respectively disposed in the recesses in order to captively hold the centering elements in the holding element.

2. The device according to claim 1, wherein the centering elements are each configured to be elastically deformable in the radial direction when the bearing ring is inserted into the circular opening and are collectively configured to center the bearing ring in the circular opening by using a restoring force resulting from the elastic deformation.

3. The device according to claim 2, wherein each of the centering elements has a first resilient radial projection disposed on a side of the device configured to face towards the bearing ring, each first resilient radial projection being configured to interact with a radial projection defined on the bearing ring when the centering elements are respectively disposed in the recesses and the bearing ring is inserted in the device in order to captively hold the bearing ring in the holding element.

4. The centering element according to claim 3, wherein the first resilient radial projection is directed radially inward and has a pronounced, radially-inward-pointing end surface that is configured to interact with the radial projection defined on the bearing ring, which radial projection points radially outward, such that the end surface of the first resilient radial projection is pressed against an end surface of the radial projection defined on the bearing ring.

5. The device according to claim 4, wherein the centering elements are disposed on a ring having a shape corresponding to the circumference of the circular opening, so that the centering elements are engageable into the recesses when the ring is set onto the circular opening of the holding element.

6. The device according to claim 5, wherein the centering elements are disposed equidistantly around the circumference of the circular opening.

7. The device according to claim 1, wherein the centering elements are disposed on a ring having a shape corresponding to the circumference of the circular opening, so that the centering elements are engageable into the recesses when the ring is set onto the circular opening of the holding element.

8. The device according to claim 1, wherein the centering elements are disposed equidistantly around the circumference of the circular opening.

9. A bearing assembly comprising:
a bearing holding element defining a circular opening in which a bearing ring is centered;
at least three centering elements that are each elastically deformable in a radial direction, the centering elements being configured to be respectively disposed in recesses defined in and around a circumferential edge of the circular opening and being configured to center the bearing ring upon its insertion into the circular opening,
wherein a resilient hook is disposed on each centering element on a side of the centering device configured to face towards the circumferential edge of the circular opening, each resilient hook being configured to latch under a radially inwardly projecting projection formed by the recesses of the holding element when the centering elements are respectively disposed in the recesses in order to captively hold the centering elements in the holding element,
at least one axial portion of the bearing ring has an outer diameter less than at least one other axial portion of the bearing ring,
each of the centering elements has a first resilient radial projection disposed on a side of the device that faces towards the bearing ring,
an annular radial projection is disposed in an axial end region of the reduced outer diameter of the bearing ring, the annular radial projection interacting with the first resilient radial projections respectively disposed on the centering elements so as to captively hold the bearing ring in the holding element.

10. The bearing assembly according to claim 9, wherein:
the annular radial projection projects radially outwardly and has a pronounced, radially-outwardly-pointing end surface, which interacts with radially-inwardly-pointing projections respectively defined on the centering elements so that the end surface of the annular radial projection is pressed against an end surface of the radially-inwardly-pointing projections, and
the resilient hooks latch under a radial projection extending from the edge region of the holding element and captively hold the centering elements in the holding element.

11. A bearing assembly comprising:
a bearing holding element defining a circular opening in which a bearing ring is centered;
at least three centering elements that are each elastically deformable in a radial direction, the centering elements being configured to be respectively disposed in recesses defined in and around a circumferential edge of the circular opening and being configured to center the bearing ring upon its insertion into the circular opening, wherein the centering elements are elastic in the radial direction, are formed from a plastic, and are disposed equidistantly around the circumference of the circular opening,
a ring on which the centering elements are disposed, the ring having a shape corresponding to the circumference of the circular opening, so that the centering elements are engageable into the recesses when the ring is set onto the circular opening of the holding element,
each of the centering elements has a first resilient radial projection disposed on a side of the device configured to face towards the bearing ring, each first resilient radial projection being configured to interact with a radial projection defined on the bearing ring when the centering elements are respectively disposed in the recesses and the bearing ring is inserted in the device in order to captively hold the bearing ring in the holding element,
the first resilient radial projection is directed radially inward and has a pronounced, radially-inward-pointing end surface that is configured to interact with the radial projection defined on the bearing ring, which radial projection points radially outward, such that the end surface of the first resilient radial projection is pressed against an end surface of the radial projection defined on the bearing ring,
a resilient hook is disposed on each centering element on a side of the centering device configured to face towards the circumferential edge of the circular opening, each resilient hook being configured to latch under a radially inwardly projecting projection formed by the recesses of the holding element when the centering elements are respectively disposed in the recesses in order to captively hold the centering elements in the holding element,
at least one axial portion of the bearing ring has an outer diameter less than the outer diameter of at least one other axial portion of the bearing ring, and
an annular radial projection is disposed in an axial end region of the reduced outer diameter, the annular radial projection interacting with the first resilient radial projections respectively disposed on the centering elements so as to captively hold the bearing ring in the holding element.

12. The bearing assembly according to claim 11, wherein:
the annular radial projection projects radially outwardly and has a pronounced, radially-outwardly-pointing end surface, which interacts with radially-inwardly-pointing projections respectively defined on the centering elements so that the end surface of the annular radial projection is pressed against an end surface of the radially-inwardly-pointing projections, and the resilient hooks latch under a radial projection extending from the edge region of the holding element and captively hold the centering elements in the holding element.

13. A device for centering a bearing ring, comprising:

a bearing holding element defining an opening configured to receive the bearing ring, the opening having a circumference defined by a sidewall that is continuous and forms a circular shape;

a plurality of recesses defined in the bearing holding element each forming a radially inwardly projecting projection proximate to the circumference of the opening such that the sidewall of the opening retains the circular shape;

a ring having an annular shape corresponding to the circumference of the opening such that a portion of the ring overlies the bearing holding element and another portion of the ring overlies the opening;

a plurality of centering elements disposed on the ring that are each elastically deformable in a radial direction, each of the plurality of centering elements having a radially inwardly oriented hook configured to engage the bearing ring when the bearing ring is positioned in the opening; and wherein a resilient hook is disposed on each of the plurality of centering elements, the resilient hook being configured to face towards the circumference of the opening, the resilient hook being configured to latch onto the radially inwardly projecting projection such that a portion of the bearing holding element is disposed between the resilient hook and the ring to secure the ring thereto in order to position the centering elements in the opening.

* * * * *